(12) United States Patent
Legerton et al.

(10) Patent No.: US 8,142,016 B2
(45) Date of Patent: Mar. 27, 2012

(54) METHOD AND APPARATUS FOR CONSTRUCTING A CONTACT LENS WITH OPTICS

(75) Inventors: Jerome Legerton, San Diego, CA (US); Randall Sprague, Hansville, WA (US)

(73) Assignee: Innovega, Inc., Hansville, WA (US)

( * ) Notice: Subject to any disclaimer, the term of this patent is extended or adjusted under 35 U.S.C. 154(b) by 462 days.

(21) Appl. No.: 12/485,817

(22) Filed: Jun. 16, 2009

(65) Prior Publication Data
US 2010/0053549 A1 Mar. 4, 2010

Related U.S. Application Data

(63) Continuation-in-part of application No. 12/204,567, filed on Sep. 4, 2008.

(51) Int. Cl.
*G02C 7/02* (2006.01)
*G02C 7/04* (2006.01)
*B29D 11/00* (2006.01)

(52) U.S. Cl. ......... 351/177; 351/161; 264/1.32; 264/2.5

(58) Field of Classification Search .............. 351/160 R, 351/161, 177; 264/1.32, 2.5
See application file for complete search history.

(56) References Cited

U.S. PATENT DOCUMENTS

| | | |
|---|---|---|
| 3,637,416 A | 1/1972 | Misch |
| 3,794,414 A | 2/1974 | Wesley |
| 3,973,837 A | 8/1976 | Page |
| 4,166,255 A | 8/1979 | Graham |
| 4,805,988 A | 2/1989 | Dones |
| 5,035,473 A | 7/1991 | Kuwayama et al. |
| 5,160,463 A | 11/1992 | Evans |
| 5,331,149 A | 7/1994 | Spitzer et al. |
| 5,369,415 A | 11/1994 | Richard |
| 5,625,372 A | 4/1997 | Hildebrand et al. |
| 5,644,323 A | 7/1997 | Hildebrand et al. |

(Continued)

FOREIGN PATENT DOCUMENTS

FR 2681702 3/1993
(Continued)

OTHER PUBLICATIONS

Patent Cooperation Treaty, International Search Report & Written Opinion of the International Search Authority, PCT/US2009/055758, Oct. 29, 2010, 16 pages.

*Primary Examiner* — Jack Dinh
(74) *Attorney, Agent, or Firm* — Viksnins Harris & Padys PLLP

(57) ABSTRACT

Various embodiments of the present invention provide systems, methods, and processes for constructing a contact lens. In one embodiment, a contact lens assembly is provided, comprising: a curved polymer polarizer with an aperture; a lenslet disposed inside the aperture, wherein the lenslet enables imaging near objects; and a filter attached to the lenslet. In further embodiments, a method for fabricating a flexible contact lens is provided, comprising: fabricating an element having an extrusion; providing a front concave mold, wherein the front mold has an intrusion to accommodate the extrusion of the optical element; affixing the extrusion of the optical element to the intrusion of the front mold; attaching a back convex mold to the front concave mold, thereby forming a mold cavity; and filling the mold cavity with a pre-polymerized liquid, whereby upon polymerization, the pre-polymerized liquid forms the flexible contact lens and the optical element is partially encapsulated within the lens.

13 Claims, 22 Drawing Sheets

U.S. PATENT DOCUMENTS

| | | | |
|---|---|---|---|
| 5,757,458 A | 5/1998 | Miller | |
| 5,786,883 A | 7/1998 | Miller | |
| 5,905,561 A | 5/1999 | Lee et al. | |
| 5,973,845 A | 10/1999 | Hildebrand et al. | |
| 5,980,040 A | 11/1999 | Xu et al. | |
| 6,023,372 A | 2/2000 | Spitzer | |
| 6,204,974 B1 | 3/2001 | Spitzer | |
| 6,217,171 B1 | 4/2001 | Auten et al. | |
| 6,284,161 B1 | 9/2001 | Thakrar | |
| 6,384,982 B1 | 5/2002 | Spitzer | |
| 6,452,572 B1 | 9/2002 | Fan et al. | |
| 6,771,423 B2 | 8/2004 | Geist | |
| 6,874,888 B1 | 4/2005 | Dudai | |
| 7,048,378 B2 * | 5/2006 | Chen | 351/177 |
| 203,323 A1 | 9/2006 | Tonar et al. | |
| 7,329,001 B2 | 2/2008 | Benrashid et al. | |
| 122,865 A1 | 5/2008 | Vanmoor | |
| 7,461,937 B2 | 12/2008 | Steffen et al. | |
| 2007/0052886 A1 | 3/2007 | Fan | |
| 2007/0291224 A1 | 12/2007 | Lai | |
| 2009/0059164 A1 | 3/2009 | Steffen et al. | |
| 2009/0116096 A1 | 5/2009 | Zalevsky | |
| 2009/0189974 A1 | 7/2009 | Deering | |
| 2010/0053030 A1 | 3/2010 | Sprague | |
| 2010/0053121 A1 | 3/2010 | Sprague | |
| 2010/0149618 A1 | 6/2010 | Sprague | |
| 2010/0265163 A1 | 10/2010 | Legerton et al. | |

FOREIGN PATENT DOCUMENTS

| | | |
|---|---|---|
| GB | 2272980 | 6/1994 |
| GB | 2292248 | 2/1996 |
| WO | WO 91/06031 | 5/1991 |
| WO | WO 01/45080 | 6/2001 |

* cited by examiner

METHOD AND APPARATUS FOR CONSTRUCTING A CONTACT LENS WITH OPTICS

RELATED APPLICATION

This application is a continuation-in-part of and claims the benefit of U.S. patent application Ser. No. 12/204,567 filed Sep. 4, 2008, which is hereby incorporated herein by reference in its entirety.

FIELD OF THE INVENTION

The present invention is related to optics and, more specifically, is directed toward the construction of contact lenses having optics used in processing display and non-display optical information.

DESCRIPTION OF THE RELATED ART

Current systems for optical processing of display information provided by a head-mounted display and non-display information provided by objects other than the head-mounted display have characteristics that make them unattractive solutions for many applications. The twin requirements of a large field of view and a comfortable eye-to-system distance for the viewer result in multi-component optical systems where the final optical component has a large diameter. Such systems tend to be large, bulky and ill suited for applications where little space is available for processing the display information and the non-display information. For example, such systems are unattractive solutions for processing display and non-display information in a fighter pilot's helmet where the space for the optical system is limited.

BRIEF SUMMARY OF THE EMBODIMENTS OF THE INVENTION

Various embodiments of the present invention provide systems, methods, and processes for constructing a contact lens.

In one embodiment, a contact lens assembly is provided, comprising: a curved polymer polarizer with an aperture; a lenslet disposed inside the aperture, wherein the lenslet enables imaging near objects; and a narrow band optical bandpass filter attached to the lenslet.

In another embodiment, a contact lens assembly is provided, comprising: a curved polymer polarizer having an aperture and a first polarization; a second polymer polarizer having a second polarization; and a lenslet disposed inside the aperture for imaging near objects.

In a further embodiment, a contact lens assembly is provided, comprising: a curved transparent substrate having at least one patterned filter; and a lenslet attached to the curved transparent substrate. In some such embodiments, the patterned filter is a polarization filter or a patterned spectral filter. In those embodiments where the patterned filter is a patterned spectral filter, the contact lens may further comprise perforations or slots in the patterned spectral filter that allows gasses to permeate through the filter.

In an alternative embodiment, a contact lens assembly is provided, comprising: a substrate made of a molded contact lens material; comprising a curved transparent substrate having at least one optical filter, wherein the curved transparent substrate has an index of refraction less than the molded contact lens material. An indent in the curved transparent substrate is filled with the molded contact lens material such that the indent forms an optical power capable of viewing close objects.

For some embodiments described herein, the lenslet may be a refractive lens or a diffractive lens. For further embodiments described herein, the lenslet may be substantially wider in a horizontal direction than in a vertical direction, thereby enabling wider viewing angles in the horizontal direction.

In a further embodiment, a contact lens assembly is provided, comprising: a substrate comprising a lenslet, and a surrounding region that encircles the lenslet and has a power sufficient to correct normal vision, wherein the lenslet has a power that is at least 25 diopters greater than the surrounding region. In some such embodiments, the lenslet has a power that is 40 or more diopters greater than the surrounding region.

In another embodiment, a contact lens assembly is provided, comprising: a substrate including a display information optical path to receive display information and a non-display optical path to receive non-display information, the non-display information optical path including an attenuator that blocks display information. By way of example, the attenuator may be a gray filter.

Further embodiments of the invention provide a method for fabricating a flexible contact lens, comprising: fabricating at least one optical element having an extrusion; providing a front concave mold, wherein the front mold has an intrusion to accommodate the extrusion of the optical element; affixing the extrusion of the optical element to the intrusion of the front mold; attaching a back convex mold to the front concave mold, thereby forming a mold cavity; and filling the mold cavity with a pre-polymerized liquid, whereby upon polymerization, the pre-polymerized liquid forms the flexible contact lens and the optical element is partially encapsulated within the lens.

In some such embodiments, at least one optical element is a refractive lenslet, a diffractive lenslet, a pinhole aperture, a selective chromatic filter, a circular polarizing filter, a linear polarizer filter, a gray attenuator filter, a zone plate, or a birefringent filter. In further such embodiments, the extrusion of the optical element is affixed to the intrusion of the front mold using a material that is not soluble by the pre-polymerized liquid. In further such embodiments, the extrusion of the optical element is affixed to the intrusion of the front mold using a material that is removable upon extracting and hydrating the polymerized lens.

In some embodiments where at least one optical element is a pinhole aperture, the pinhole aperture has a diameter from about 0.5 to 2 millimeters. In some embodiments where at least one optical element is a refractive lenslet, the refractive lenslet has an optical power sufficient to provide a multifocal capability that corrects presbyopia. In other embodiments where at least one optical element is a refractive lenslet, the refractive lenslet has an optical power sufficient to allow a retina to focus on an object in a spectacle plane. In other embodiments where at least one optical element is a diffractive lenslet, the diffractive lenslet has a focal power for distance and near such that the focal power corrects presbyopia.

In another embodiment, a method for fabricating a flexible contact lens is provided, comprising: fabricating at least one optical element; partially encapsulating the optical element in a first flexible material; affixing the optical element to a front mold at a central zone; attaching a back convex mold to the front concave mold, thereby forming a mold cavity; and filling the mold cavity with a pre-polymerized liquid, whereby upon polymerization the pre-polymerized liquid forms the flexible contact lens. Some such embodiments may have a front concave mold and back convex mold that are configured such that the flexible contact lens formed is a spherical contact lens or a toric contact lens.

In some such embodiments, the optical element is affixed to the front mold and the front mold is configured such that the optical element is located at a geometric center of the contact lens. In further such embodiments, the optical element is affixed to the front mold and the front mold is configured such that the optical element is displaced from a geometric center of the contact lens. In other embodiments, the optical element is fabricated to be concave, convex, or non-curved on a posterior surface.

In further embodiments, a method for fabricating a flexible contact lens is provided, comprising: pre-forming a lenslet using a pre-polymerized liquid; and forming a contact lens using the pre-polymerized liquid such that the lenslet is partially encapsulated by the contact lens.

In some such embodiments, the operation of pre-forming the lenslet comprises: partially filling a front concave mold with pre-polymerized liquid, wherein the front concave mold comprises: a first concave surface having a first boundary and a first curvature, and a second concave surface having a second boundary and a second curvature, wherein the second boundary is within the first boundary, the first curvature has a radius sufficient to form a contact lens having a first optical power, and the second curvature has a radius that is smaller than the first curvature and sufficient to form a lenslet having a second optical power; and curing the pre-polymerized liquid, thereby forming the lenslet. In further such embodiments, the second surface having the second curvature is off-center with respect to a geometric center of the front concave mold.

In other such embodiments, the operation of forming the contact lens comprises: attaching a back convex mold to a front concave mold, thereby forming a mold cavity; filling the mold cavity with pre-polymerized liquid such that the lenslet is partially encapsulated by the pre-polymerized material; and curing the pre-polymerized liquid, thereby forming the contact lens.

In additional embodiments, the operation of pre-forming a lenslet further comprises attaching a filter assembly to the lenslet before forming the contact lens. In some such embodiments, the operation of attaching the filter assembly to the lenslet comprises: applying a layer of adhesive material to the lenslet; and attaching the filter assembly to the adhesive material. The adhesive material may be a layer of the pre-polymerized liquid and the layer may be cured after the filter assembly is attached to the adhesive material. In other such embodiments, the operation of attaching the filter assembly to the adhesive material comprises centering the filter assembly over the lenslet.

Further embodiments provide a method for fabricating a flexible contact lens, comprising: pre-forming a lenslet using a pre-polymerized liquid; attaching a filter assembly to the lenslet, thereby forming an integrated optical element; and forming a contact lens using the pre-polymerized liquid such that the integrated optical element is fully encapsulated by the polymerized contact lens material.

In some such embodiments, the operation of forming the contact lens comprises: attaching a back convex mold to a front concave mold, thereby forming a mold cavity; filling the mold cavity with pre-polymerized liquid such that the integrated optical element is fully encapsulated by the pre-polymerized material; and curing the pre-polymerized liquid, thereby forming the contact lens. For some such embodiments, before filling the mold cavity with pre-polymerized liquid, the lenslet is mounted to either the front concave mold or the back convex mold by a suspending element, wherein the suspending element suspends the integrated optical element at a predetermined distance from both the front concave mold and the back convex mold. For further such embodiments, the suspending element comprises a soft or rigid polymerized material that has an index of refraction approximately equal to that of the pre-polymerized liquid after the pre-polymerized liquid is cured. For other such embodiments, the integrated optical element is suspended off-center with respect to a geometric center of the contact lens.

In other such embodiments, the integrated optical element is a refractive lenslet, a diffractive lenslet, a pinhole aperture, a selective chromatic filter, a circular polarizing filter, a linear polarizer filter, a gray attenuator filter, a zone plate, or a birefringent filter.

In various embodiments, a hybrid or scleral contact lens is provided, comprising a button that contains at least one optical element that may be curved. The button may be rigid and may be made of a material suitable for diamond turning during the button's production. Additionally, the button may comprise a refractive or diffractive lenslet. In some embodiments, the button is a diamond turned lens with the lenslet produced by diamond turning the front surface. In further embodiments, the button has apertures or filters encapsulated in the rigid material of the button.

Further embodiments provide methods for construction of hybrid or scleral contact lens in accordance with various embodiments described above.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1A:
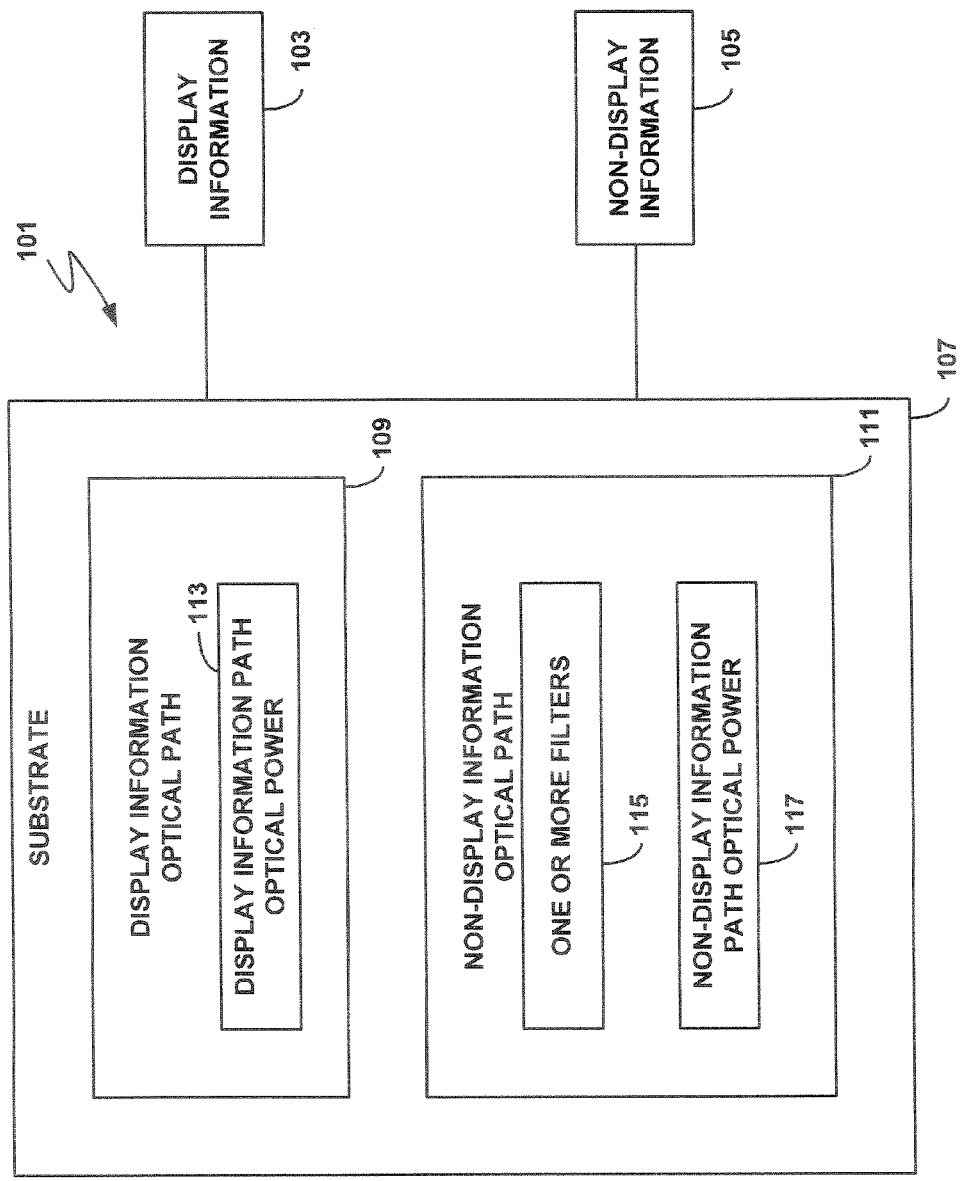
FIG. 1A is a block diagram of an example apparatus to receive and process display information and non-display information in accordance with some embodiments of the present invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The invention is directed toward systems, methods, and processes for constructing a contact lens. Specifically, various embodiments of present invention provide for contact lenses comprising a curved polymer material having a lenslet capable of assisting an eye in imaging near objects. For example, some such embodiments may assist an eye on focusing on an object that is near the eye. Other examples include a contact lens capable of combining information originating from the source, such as the real world, with information originating from a near-eye source, such as a near-eye display.

The term contact lens as used in this description is any optical system that has optical elements and is in contact with the ocular tissue. This includes any hybrid, gas permeable, soft, hard, corneal, or scleral contact lens, and any interocular, intra-corneal or intra-ocular device. Though the embodiments to follow are described in terms of a contact lens, one of ordinary skill in the art will appreciate after reading the following description that any of the optical systems described above could be used in place of a contact lens without deviating from the scope or principles of the present invention.

The term substrate as used in the following description includes any material or substance used to form an optical component such as a contact lens. The term zone plate includes an optical component that focuses light by diffraction. The term display information optical path includes the optical path traversed in a substrate by display information. The term non-display information optical path includes the optical path traversed in a substrate by non-display information. For some embodiments, non-display information may include what is perceived in the real world by a human eye. The term optically coupled includes two or more optical components connect by an optical path.

The term non-display information path optical power includes the optical power provided in a substrate for an optical signal passing through the non-display information path. The term substantially zero power includes an optical power that has substantially no effect on an optical signal. The term normal power is the optical power necessary to provide a correction in an optical system, such as a human visual system for defects in the optical system. The term close power is the optical power necessary to provide correction in an optical system, such as a human visual system, for viewing at a close distance.

The term optical path optics in this description includes objects and laminates disposed on or within a contact lens such that the object or laminate affects light rays in a given optical path. Such objects can be fully or partially embedded within a contact lens, or laminates disposed on or within a contact lens.

The term electromagnetic radiation includes energy in the form of transverse electric and magnetic waves. The term electromagnetic radiation includes electromagnetic radiation in the visible spectrum. The term illuminating includes directing or transmitting electromagnetic radiation to a target.

The term filter includes apparatus or methods for selectively transmitting electromagnetic radiation. The term characteristic feature includes detectable traits, such as narrow bandwidth or polarization, by which signals can be distinguished.

The term notch filter includes a filter that blocks electromagnetic radiation over a substantially continuous narrow band of frequencies. The term non-display path notch filter includes a notch filter included in the non-display path of a substrate.

The term bandpass filter includes a filter that transmits electromagnetic radiation over a substantially continuous but finite band of frequencies. The term display path bandpass filter includes a bandpass filter included in the display path of a substrate.

The term polarizing filter includes a filter that polarizes electromagnetic radiation. The term display path polarizing filter includes a polarizing filter included in the display information path of a substrate. The term non-display path polarizing filter includes a polarizing filter included in the non-display information path of a substrate. The term shutter includes a controllable polarizing filter. The term substantially opaque filter includes a filter that blocks all or nearly all of the information received by the filter.

The term display includes any apparatus capable of generating information in the form of electromagnetic radiation. The term organic light emitting diode display includes one or more light-emitting diodes whose light emitting layer includes a film of one or more organic compounds. The term display information includes information provided by a display.

The term controllable optical materials includes materials whose optical properties, such as opacity, can be controlled. The term photochromic material includes materials whose optical properties can be controlled by an optical signal. The term electrochromic material includes an optical material whose properties can be controlled by an electrical signal. The term optical material activation signal includes signals to control the optical properties of a controllable optical material.

The term a pattern of pixel sites includes the organization of pixel sites on a substrate. The term substantial transparent pixel unit includes a portion of a display that transmits electromagnetic radiation generated outside the display. The term checkerboard pattern includes an alternating pattern similar to the pattern of a checkerboard.

In some embodiments, as illustrated and described herein, information provided by a head-mounted display, referred to as display information, and information provided by objects other than the head-mounted display, referred to as non-display information, are received at a contact lens included in a human visual system. A head-mounted display may include an organic light emitting diode display to provide the display information. The contact lens in combination with the human visual system provides images of the display information and the non-display information to the retina of the human visual system. The display information may include, for example, text information, non-text information or other visual information. The non-display information may include, for example, landscape information, non-landscape information, and other visual information.

The contact lens includes a display information optical path and a non-display information optical path. The display information optical path provides a contact lens transmission path between the head-mounted display and the human visual system for the display information transmitted by the head-mounted display. The display information optical path forms a substantially cylindrical central region of the contact lens. The display information optical path in the contact lens can provide power to assist the human visual system in focusing objects positioned close to the human lens.

The non-display information optical path provides a contact lens transmission path between the source of the non-display information and the human visual system for the non-display information. The non-display information optical path forms a substantially annular ring surrounding the cylindrical central region of the display information optical path. A filter is included in the non-display information optical path to substantially block display information from being transmitted through the non-display information optical path. The non-display information optical path in the contact lens may provide correction for defects, such as nearsightedness, farsightedness, and astigmatism with or without presbyopia in the human visual system.

The display information and the non-display information may be polarized to different polarizations to provide for distinguishing between the display information and the non-display information. Polarizing the display information and the non-display information enables independent processing of the display information and non-display information at the contact lens and enables time-domain multiplexing in the transmission of the display information and the non-display information to the contact lens. The time-domain multiplexed display information and non-display information when processed by the human visual system are perceived as a single image. Further detailed description of these and other embodiments is provided below.

FIG. 1A shows a block diagram of an apparatus 101 to receive and process display information 103 and non-display information 105 in accordance with some embodiments. The apparatus 101 includes a substrate 107 including a display information optical path 109 to receive the display information 103 and a non-display information optical path 111 to receive the non-display information 105. The display information optical path 109 includes a display information path optical power 113. The non-display information optical path 111 includes one or more filters 115 and a non-display information path optical power 117.

The substrate 107 is not limited to being formed from a particular material or combination of materials. Materials suitable for use in forming optical components, such as lenses, may be used in forming the substrate 107. Exemplary materials suitable for use in forming the substrate 107 include gels, such as silicone hydrogels, glasses, plastics, and polymers, such as polymethyl methacrylate and polymacon. The substrate 107 is not limited to a particular type of optical component. In some embodiments, the substrate 107 includes a substrate or blank suitable for forming one lens, such as a contact lens. In some embodiments, the substrate 107 includes one or more optical components or lenses, such as focusing lenses, formed from one or more optical materials. In certain embodiments, the substrate 107 is formed from a flexible material conformable to the shape of a human cornea. In some embodiments, the substrate 107 is formed by filling a contact lens mold with one or more liquid monomers and initiators.

The display information 103 includes electromagnetic radiation, such as visible light, having at least one characteristic feature lacking in the non-display electromagnetic radiation of the non-display information 105. For example, in some embodiments, the display information 103 includes electromagnetic radiation having a narrow spectral bandwidth while the non-display information 105 includes electromagnetic radiation having a broad spectral bandwidth. Narrow spectral bandwidth and broad spectral bandwidth are relative terms. In some embodiments, for two signals, the signal having the narrower spectral bandwidth information is the signal having a narrow spectral bandwidth and the signal having the broader spectral bandwidth information is the signal having a broad spectral bandwidth. In some embodiments, narrow spectral bandwidth information includes information having a bandwidth of between about a few nanometers and a few tens of nanometers. In some embodiments, broad spectral bandwidth information includes information having a bandwidth greater than about a few tens of nanometers. Thus, the non-display electromagnetic radiation having a broad spectral bandwidth lacks the characteristic feature—narrow spectral bandwidth—included in the display information 103.

As a second example, in some embodiments, the display information 103 includes electromagnetic radiation having a display information polarization, such as right-handed circular polarization, and the non-display information 105 includes unpolarized information. Thus, the non-display information 105 including the non-display electromagnetic radiation having the unpolarized information lacks the characteristic feature—right handed circular polarization—included in the display information 103.

The display information optical path 109 is included in the substrate 107 and is formed from an optical material or combination of materials. The display information optical path 109 is not limited to being formed from a particular optical material or combination of materials. Materials suitable for use in forming the substrate 107 are suitable for use in forming the display information optical path 109. The materials used to form the display information optical path 109 may differ from the one or more materials used to form the substrate 107.

Figure 1B:
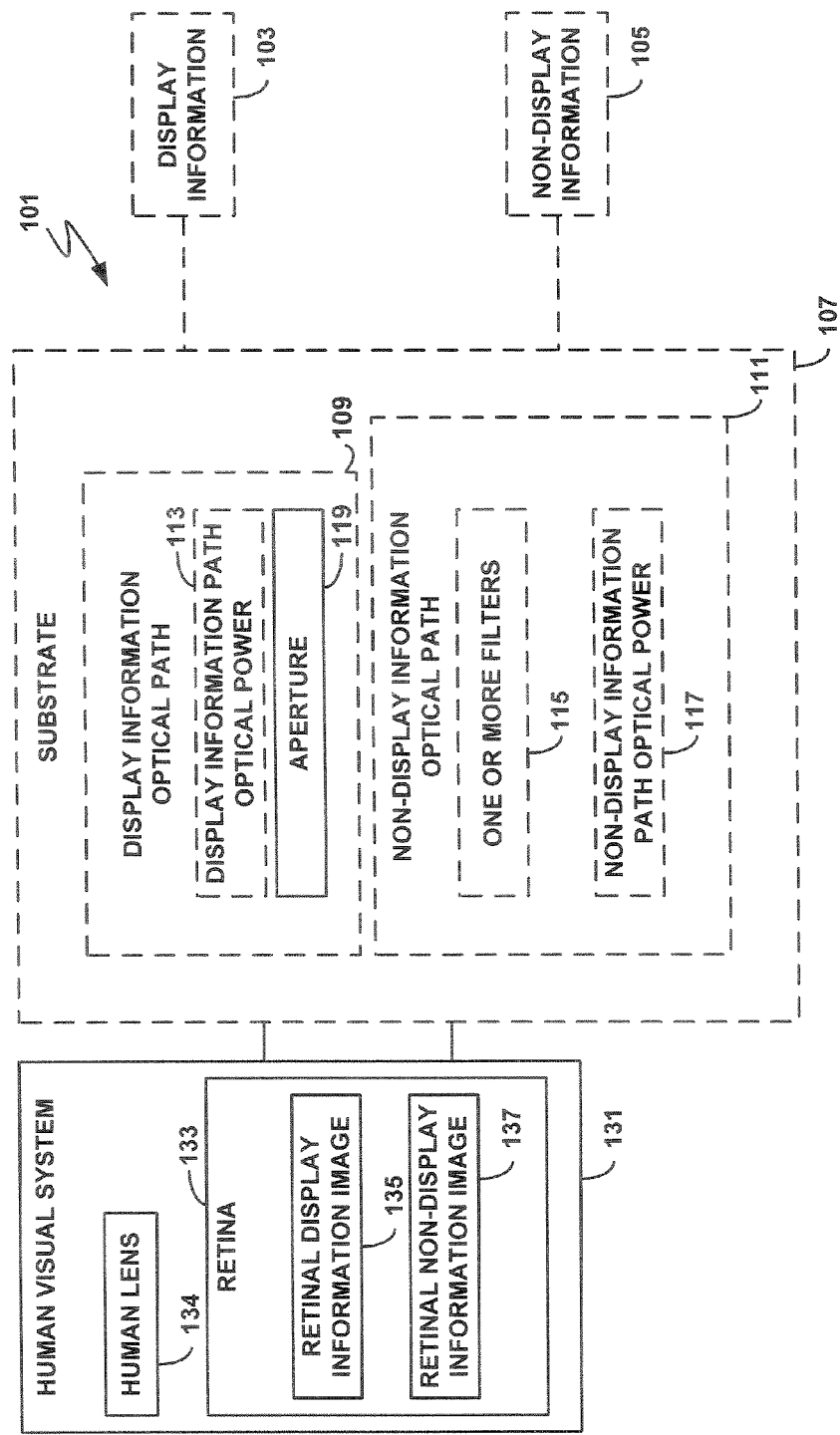
FIG. 1B is a block diagram of the example apparatus (shown in FIG. 1A) coupled to a human visual system in accordance with some embodiments of the present invention.

In operation, the display information optical path 109 receives and transmits electromagnetic information, such as the display information 103. When coupled to a human visual system (as shown in FIG. 1B), the display information optical path 109 receives the display information 103 and assists the human visual system to substantially focus the display information 103 to a retina in the human visual system The non-display information optical path 111 is included in the substrate 107 and is formed from an optical material or combination of materials. The non-display information optical path 111 is not limited to being formed from a particular optical material or combination of materials. Materials suitable for use in forming the substrate 107 are suitable for use in forming the non-display information optical path 111. The materials used to form the non-display information optical path 111 may differ from the one or more materials used to form the substrate 107.

In operation, the non-display information optical path 111 receives the non-display information 105 and when coupled to a human visual system (as shown in FIG. 1B) substantially focuses the non-display information 105 to a retina in the human visual system. The non-display information 105 includes any information, such as visible objects, not included in the display information 103. In some embodiments, the non-display information 105 is provided from objects more distant from the human visual system than the source of the display information 103. For example, in some embodiments, the display information 103 is provided to a human visual system from a head-mounted display located between about 5 millimeters and about 200 millimeters from the cornea, and the non-display information 105 is provided to the human visual system from a source located at a distance of greater than about 200 millimeters from the cornea.

The one or more filters 115 included in the non-display information optical path 111 substantially block the display information 103 while substantially transmitting the non-display information 105. Each of the one or more filters 115 is sensitive to a physical characteristic, such as wavelength, frequency, or polarization, of the display information 103. Thus, the one or more filters 115 may include any filter or combination of filters or other optical components capable of substantially blocking the display information 103 while substantially transmitting the non-display information 105.

Optical power is the degree to which a lens or mirror converges or diverges light or electromagnetic radiation. A lens or mirror having substantially zero optical power neither converges nor diverges electromagnetic radiation. Normal power is the power necessary to provide correction in an optical system such as a human visual system, for defects in the optical system. For example, normal power includes a power to correct for nearsightedness, farsightedness, or astigmatism in a human visual system. In some embodiments, a normal power is between about 0.25 and about 10 diopters or more.

Close power is the power necessary to provide correction in an optical system, such as a human visual system, for viewing at a close distance. In a human visual system, a close distance is a distance of less than about 250 millimeters. For objects closer than about 250 millimeters, the human visual system cannot form a sharp image on the retina. A focusing lens can provide close power to assist a human visual system in viewing objects at distances of less than about 250 millimeters. In some embodiments, the close power is between about 5 and about 200 diopters.

In some embodiments, the apparatus 101 includes combinations of optical powers. In some embodiments, the display information path optical power 113 includes substantially zero power and the non-display information path optical power 117 includes substantially zero power. In other embodiments, the display information path optical power 113 includes substantially zero power and the non-display information path optical power 117 includes a normal power. In further embodiments, the display information path optical power 113 includes a close power and the non-display information path optical power 117 includes substantially zero power. In additional embodiments, the display information path optical power 113 includes a close power and the non-display information path optical power 117 includes normal power. In additional embodiments, the non-display information path includes two or more optical powers. For example, some embodiments may use the two or more optical powers for correction of presbyopia or for enabling the eye to properly focus for two or more distances other than the display path.

FIG. 1B shows a block diagram of the apparatus 101 (shown in FIG. 1A) coupled to a human visual system 131 in accordance with some embodiments. The apparatus 101 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more filters 115 and the non-display information path optical power 117.

In some embodiments, the display information optical path 109 has an aperture 119. The aperture 119 may be sized to assist in focusing the display information 103. In some embodiments, the aperture 119 is sized to increase the depth of focus in the display information optical path 109. In some embodiments, the aperture 119 has a diameter of about one millimeter.

In operation, the display information optical path 109 and the non-display information optical path 111 assist the human visual system 131 in forming a focused image of the display information 103 and a focused image of the non-display information 105 on a retina 133. The display information optical path 109 in cooperation with the human visual system 131, including the human lens 134, substantially focuses the display information 103 to the retina 133 to form retinal display information image 135. The non-display information optical path 111 in cooperation with the human visual system 131, including the human lens 134, substantially focuses the non-display information 105 to the retina 133 to form retinal non-display information image 137. At least one of the one or more filters 115 in the non-display information optical path 111 substantially blocks the display information 103 from entering the human visual system 131 from the non-display information optical path 111.

Figure 1C:
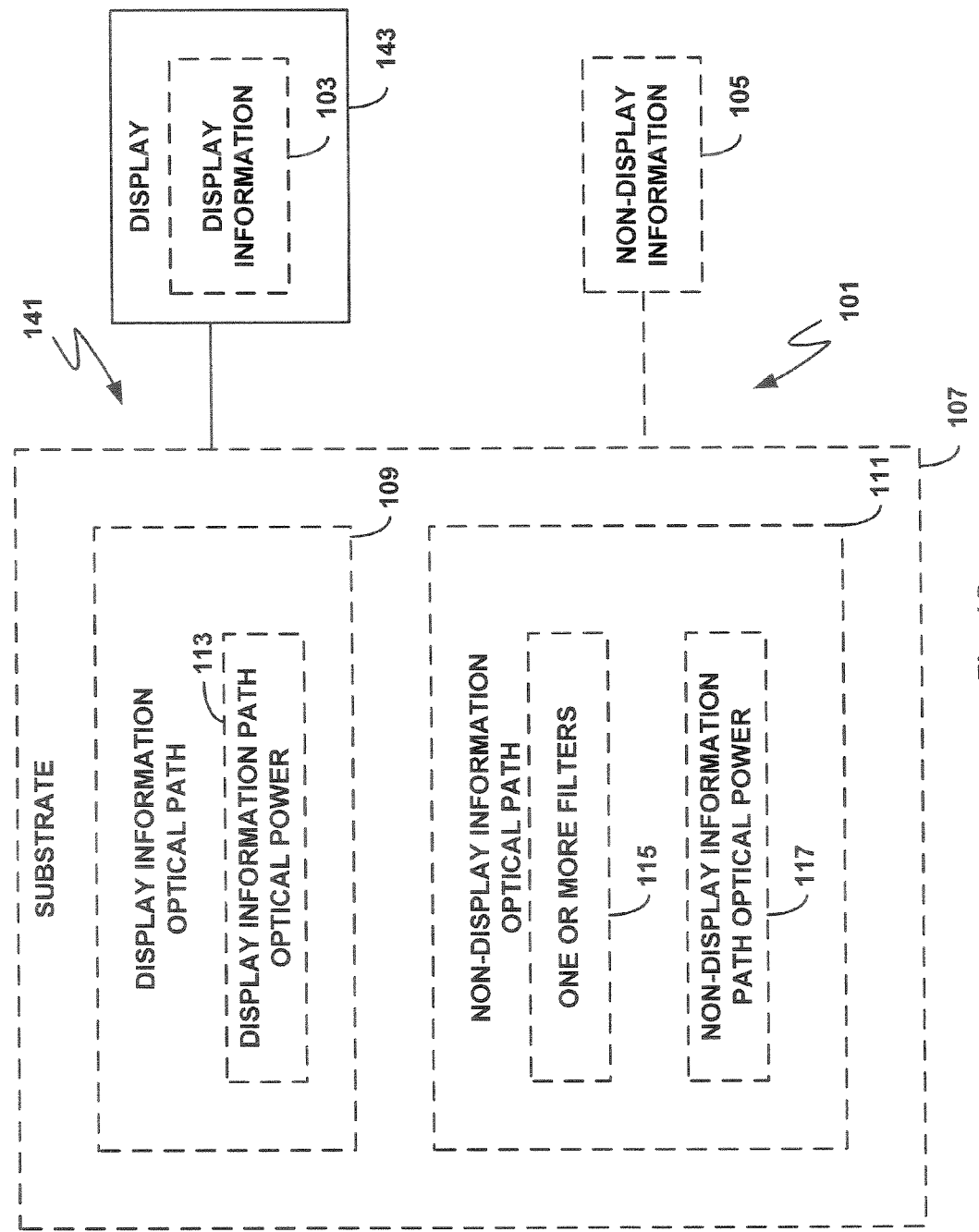
FIG. 1C is a block diagram of an example apparatus including the apparatus (shown in FIG. 1A), and further including a display to provide the display in accordance with some embodiments of the present invention.

FIG. 1C shows a block diagram of an apparatus 141 including the apparatus 101 (shown in FIG. 1A), and further including a display 143 to provide the display information 103 in accordance with some embodiments. The apparatus 101 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more filters 115 and the non-display information path optical power 117.

In some embodiments, the display information 103 includes information provided by the display 143. The display 143 includes any device or system that provides information in the form of electromagnetic radiation, such as visible light. For example, in some embodiments, the display information 103 is provided by a device including a single two-state source of visible light.

The display 143 is not limited to a particular type of display. In some embodiments, the display 143 includes microdisplays and other small displays, such as displays having a thickness of between about 100 microns and about two millimeters, flat screen displays, such as liquid crystal displays, and cathode ray tube displays. In some embodiments, the display 143 is mounted in an eyeglass frame. In operation, in some embodiments, the distance between the display and a human cornea is between about 5 millimeters and about 200 millimeters.

The display information 103 provided by the display 143 may include a characteristic feature related to the wavelength of the display information 103. In some embodiments, the display information 103 provided by the display 143 includes information having a narrow spectral bandwidth. Exemplary displays that provide the display information 103 having a narrow spectral bandwidth include organic light emitting diode displays and electroluminescent displays.

The display 143 is not limited to providing the display information 103. In some embodiments, the display 143 is substantially occluded, partially occluded, or substantially transparent. For a partially occluded or substantially transparent display, the display 143 may transmit the non-display information 105 in addition to providing the display information 103. An organic light emitting diode display is an exemplary display capable of providing substantially transparent, partially occluded, and substantially occluded operation.

Figure 1D:
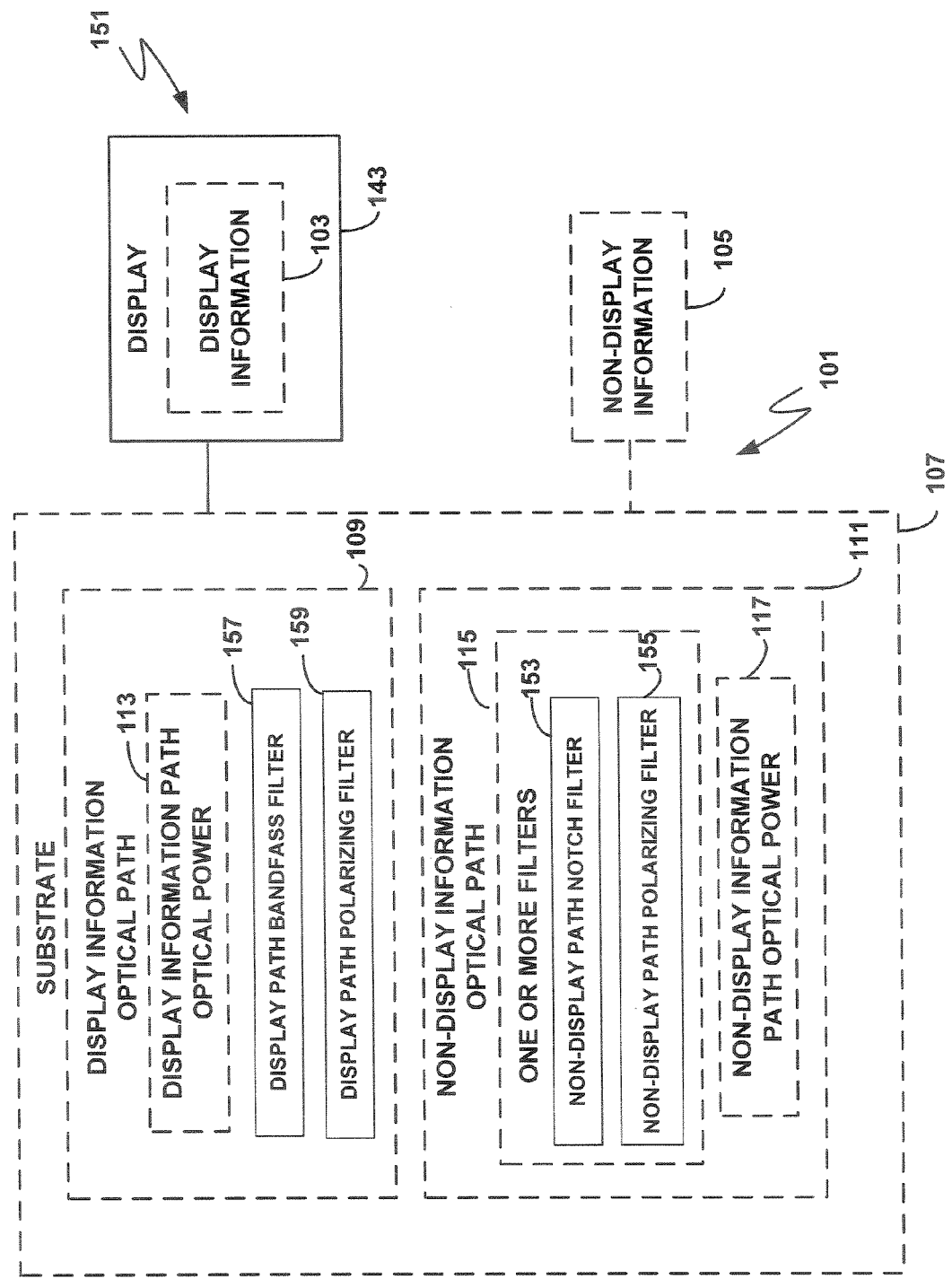
FIG. 1D is a block diagram of an example apparatus including the apparatus (shown in FIG. 1A), wherein at least one of the one or more filters (shown in FIG. 1A) includes a non-display path notch filter or a non-display path polarizing filter and further including the display (shown in FIG. 1C) to provide the display information (shown in FIG. 1A) in accordance with some embodiments of the present invention.

FIG. 1D shows a block diagram of an apparatus 151 including the apparatus 101 (shown in FIG. 1A), wherein at least one of the one or more filters 115 includes a non-display path notch filter 153 or a non-display path polarizing filter 155 and further including the display 143 to provide the display information 103 in accordance with some embodiments. The apparatus 101 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more filters 115 and the non-display information path optical power 117. In some embodiments, the display information optical path includes a display path bandpass filter 157. In other embodiments, the display information optical path includes a display path polarizing filter 159.

The non-display path notch filter 153 is selected to substantially block the display information 103 in the non-display information optical path 111. In some embodiments, the non-display path notch filter 153 is selected to block at least about 90% of the energy included in the display information 103. Blocking less than about 90% of energy included in the display information 103 may result in blurring of the display information 103 and the non-display information 105. The non-display path notch filter 153 is not limited to a particular type of notch filter. In some embodiments, the non-display path notch filter 153 includes a thin film interference filter, such as a rugate filter. Notch filters, such as the non-display path notch filter 153, are formed by periodically varying the refractive index in each of a plurality of discrete thin film layers included in a contact lens. Microlithographic processes can be applied to each of the plurality of discrete thin film layers to pattern the notch filters. The plurality of discrete thin film layers may be introduced into the contact lens during the molding of the lens.

In operation, the non-display path notch filter 153 is included in the non-display information optical path 111 to block narrow bandwidth electromagnetic radiation included in the display information 103. If the non-display information 105 includes broad spectral bandwidth electromagnetic radiation, the non-display path notch filter 153 has substantially no effect on the non-display information 105. The non-display information 105 passes through the non-display information optical path 111 substantially unchanged.

In some embodiments, the frequencies to be blocked by the non-display path notch filter 153 include the primary colors included in the spectrum of the display information 103. For example, for the display information 103 having primary colors red, green, and blue, the one or more filters 115 are selected to substantially block narrow spectrum red, green, and blue. In order to substantially block narrow spectrum red, green, and blue, the transmission cue includes "notches" or a transmission coefficient of substantially zero at the one or more bands of frequencies to be blocked. In some embodiments, the "notches" have a bandwidth that blocks a band of frequencies, such as, for example, a band of frequencies having a narrow spectrum of between about two and about thirty nanometers, centered on each of the primary colors, red, green, and blue.

The non-display path polarizing filter 155 is selected to substantially block the display information 103 in the non-display information optical path 111. The non-display path polarizing filter 155 is not limited to a particular type of polarizing filter. In some embodiments, the non-display path polarizing filter 155 includes a filter to substantially block right-handed circularly polarized radiation. In other embodiments, the non-display path polarizing filter 155 is selected to substantially block left-handed circularly polarized electromagnetic radiation. In further embodiments, the non-display path polarizing filter 155 is selected to substantially block linearly polarized electromagnetic radiation. Pixelated micro-wires and birefringent polymers are suitable for use in forming linear polarizers for use in forming polarizing filters, such as the non-display path polarizing filter 155. Circular polarizers are formed by adding a quarter wave-plate retarder in series with a linear polarizer.

In operation, the non-display path polarizing filter 155 is included in the non-display information optical path 111 to block polarized electromagnetic radiation included in the display information 103. For example, if the display information 103 includes left-handed circularly polarized electromagnetic radiation and the non-display information 105 includes right-handed circularly polarized electromagnetic radiation, the non-display path polarizing filter 155 is selected to substantially block the left-handed circularly polarized electromagnetic radiation while having substantially no effect on the right-handed circularly polarized electromagnetic radiation of the non-display information 105. The non-display information 105 passes through the non-display information optical path 111 substantially unchanged.

The display path bandpass filter 157 is selected to substantially block the non-display information 105 in the display information optical path 109. The display path bandpass filter 157 is not limited to a particular type of bandpass filter. In some embodiments, the display path bandpass filter 157 includes a thin film interference filter, such as a rugate filter. Bandpass filters, such as the display path bandpass filter 157, are formed by varying the refractive index in each of a plurality of thin films to selectively pass the desired wavelength bands and including the plurality of discrete thin film layers in a contact lens. Microlithographic processes can be applied to the plurality of thin films to pattern the bandpass filters. The plurality of discrete thin film layers may be introduced into the contact lens during the molding of the lens.

In operation, the display path bandpass filter 157 included in the display information optical path 109 is selected to substantially block broad spectral bandwidth electromagnetic radiation included in the non-display information 105. If the display information 103 includes narrow spectral bandwidth electromagnetic radiation substantially matched to the passband of the display path bandpass filter 157, the display path bandpass filter 157 has substantially no effect on the display information 103. The display information 103 passes through the display information optical path 109 substantially unchanged.

The display path polarizing filter 159 is selected to substantially block the non-display information 105 in the display information optical path 109. The display path polarizing filter 159 is not limited to a particular type of polarizing filter. In some embodiments, the display path polarizing filter 159 includes a linearly polarized filter.

In operation, the display path polarizing filter 159 is included in the display information optical path 109 to substantially block electromagnetic radiation included in the non-display information 105. If the display information 103 includes right-handed circularly polarized electromagnetic radiation and the display path polarizing filter 159 is selected to transmit right-handed circularly polarized electromagnetic radiation, the display path polarizing filter 159 has substantially no effect on the display information 103. The display information 103 passes through the display information optical path 109 substantially unchanged.

In some embodiments, in operation the apparatus 151 processes a combination of spectral bandwidths and polarizations in the display information 103 and the non-display information 105. In some embodiments, the display information 103 includes display electromagnetic radiation having a narrow spectral bandwidth and the non-display information 105 includes non-display electromagnetic radiation having a broad spectral bandwidth. In other embodiments, the display information 103 includes display electromagnetic radiation having a display information polarization and the non-display information 105 includes non-display electromagnetic radiation having a non-display information polarization. In further embodiments, the display information 103 includes display electromagnetic radiation having a narrow spectral bandwidth and a display information polarization and the non-display information 105 includes non-display electromagnetic radiation having a broad spectral bandwidth. In additional embodiments, the display information 103 includes display information including display electromagnetic radiation having a narrow spectral bandwidth and a display information polarization and the non-display information 105 including non-display electromagnetic radiation having a broad spectral bandwidth and a non-display information polarization.

Figure 1E:
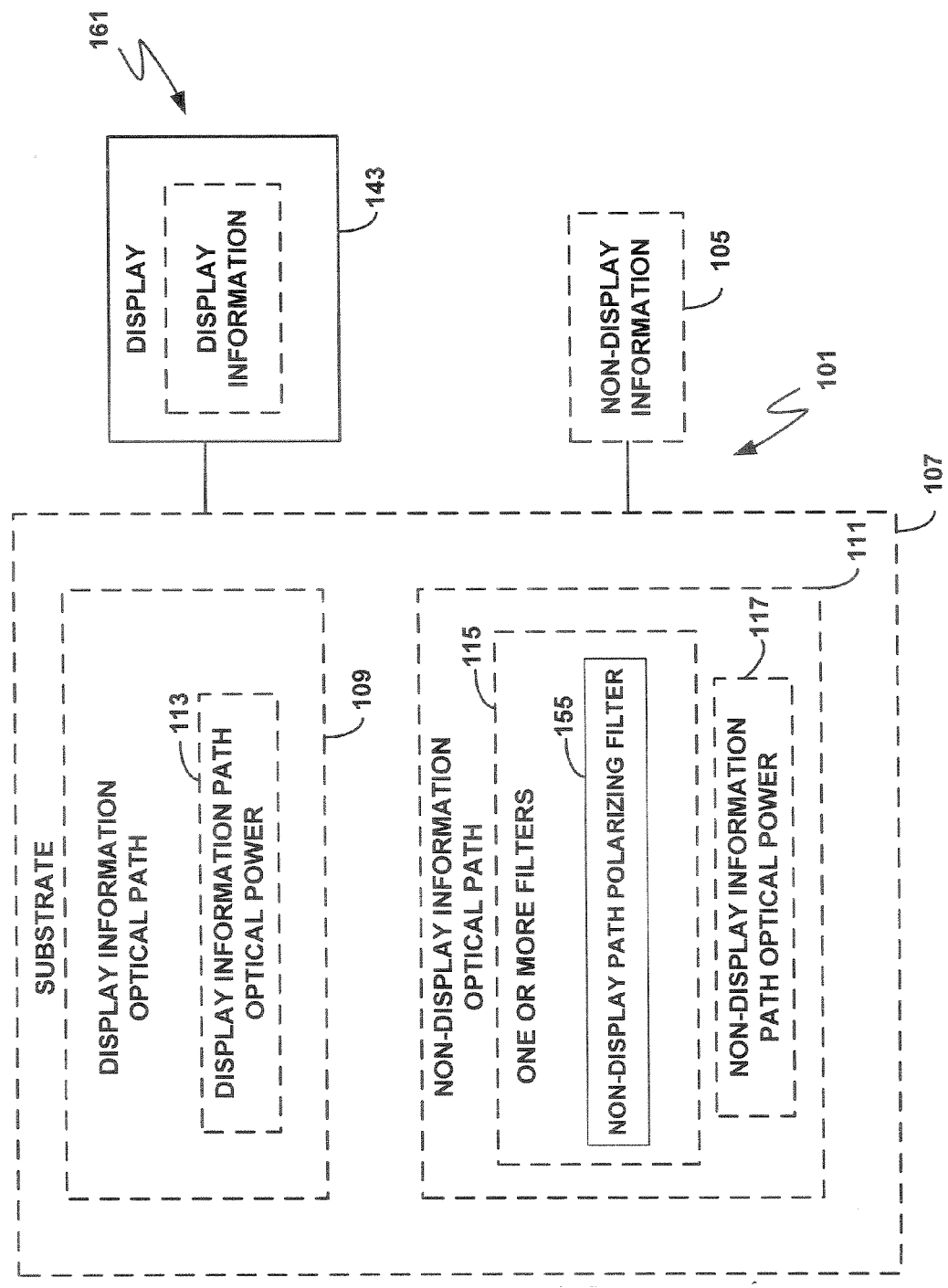
FIG. 1E is a block diagram of an example apparatus including the apparatus (shown in FIG. 1A), wherein the one or more filters include a non-display path polarizing filter (shown in FIG. 1D) and further including the display (shown in FIG. 1C) in accordance with some embodiments of the present invention.

FIG. 1E shows a block diagram of an apparatus 161 including the apparatus 101 (shown in FIG. 1A), wherein the one or more filters 115 includes the non-display path polarizing filter 155 (shown in FIG. 1D), and further including the display 143

(shown in FIG. 1C). The apparatus 101 includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more filters 115 and the non-display information path optical power 117. The display information 103 includes electromagnetic radiation having a display information polarization. The non-display information 105 includes non-display electromagnetic radiation having a non-display information polarization.

The non-display path polarizing filter 155 is selected to block the display information 103. In some embodiments, the display information 103 includes electromagnetic radiation having the display information polarization. To block the display information 103, the non-display path polarizing filter 155 is selected to block electromagnetic radiation having the display information polarization. In some embodiments, the non-display information 105 includes the non-display electromagnetic radiation having the non-display information polarization. The non-display path polarizing filter 155 is selected to pass the non-display electromagnetic radiation having the non-display information polarization.

Figure 2A:
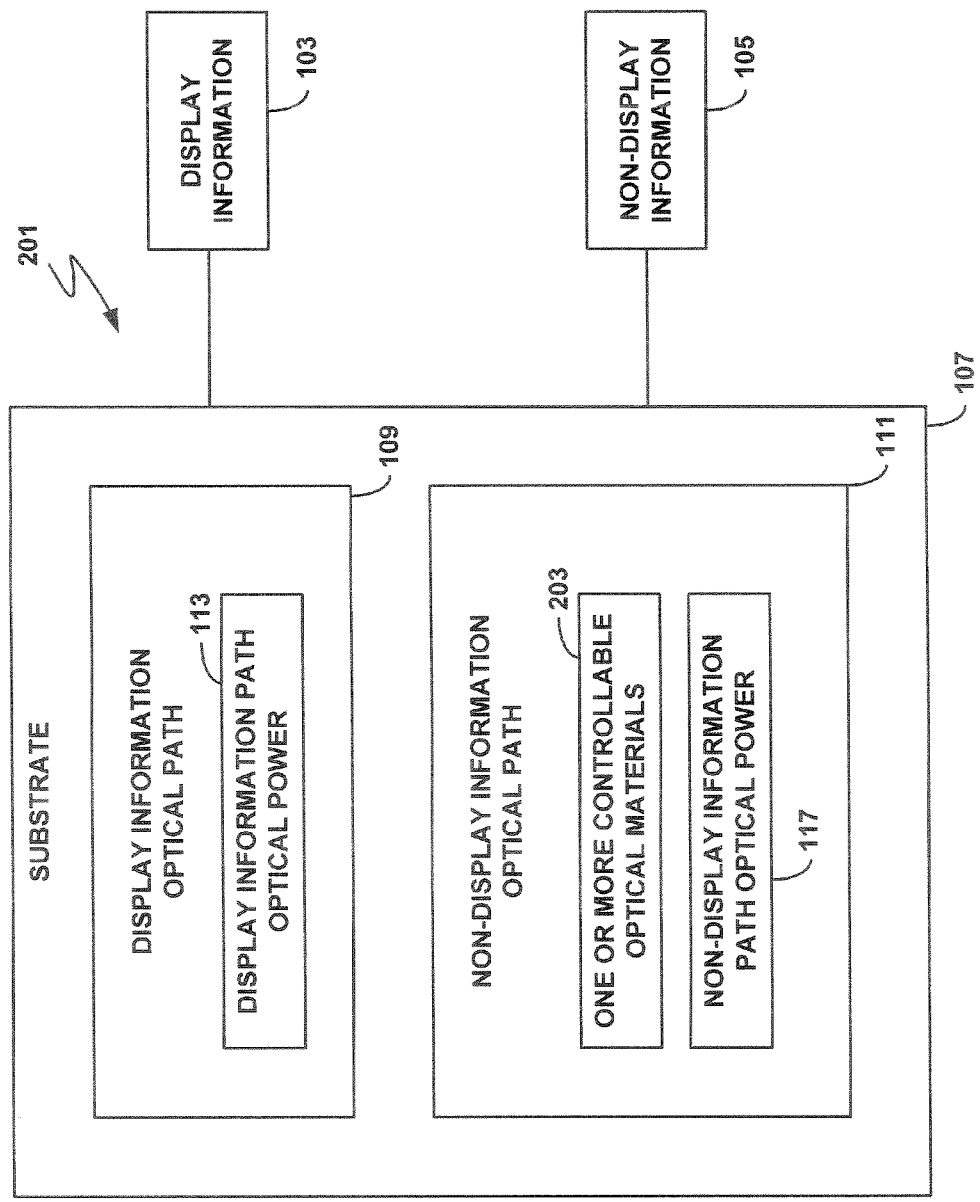
FIG. 2A is a block diagram of an example apparatus to receive and process the display information and the non-display information in accordance with some embodiments of the present invention.

FIG. 2A shows a block diagram of an apparatus 201 to receive and process the display information 103 and the non-display information 105 in accordance with some embodiments. The apparatus 201 includes the substrate 107 including the display information optical path 109 to receive the display information 103 and including the non-display information optical path 111 to receive the non-display information 105.

The display information optical path 109 includes the display information path optical power 113. The non-display information optical path 111 includes one or more controllable optical materials 203 and the non-display information path optical power 117.

The one or more controllable optical materials 203 include materials having one or more controllable optical properties. In some embodiments, the one or more controllable optical materials 203 include photochromic materials. The controllable optical properties, such as opacity, may be controlled by providing the photochromic material with an electromagnetic signal, such as an optical signal, for example, to increase or decrease the opacity of the photochromic material.

In some embodiments, the one or more controllable optical materials 203 include an electrochromic material. The one or more controllable optical properties, such as opacity, may be controlled by providing the electrochromic material with an electromagnetic signal, such as a radio frequency signal, for example, to increase or decrease the opacity of the electrochromic material.

In operation, the one or more controllable optical materials 203 included in the non-display information optical path 111 block or transmit information in the non-display information optical path 111. When at least one of the one or more controllable optical materials 203 is set to block information in the non-display information optical path 111, substantially only display information 103 in the display information optical path 109 passes through the substrate 107.

Neither the display information path optical power 113 nor the non-display information path optical power 117 is limited to a particular power. In some embodiments, the apparatus 201 includes a combination of optical powers. In some embodiments, the display information path optical power 113 includes substantially zero power and the non-display information path optical power 117 includes substantially zero power. In other embodiments, the display information path optical power 113 includes substantially zero power and the non-display information path optical power 117 includes a normal power. In further embodiments, the display information path optical power 113 includes a close power and the non-display information path optical power 117 includes substantially zero power. In additional embodiments, the display information path optical power 113 includes a close power and the non-display information path optical power 117 includes normal power. In additional embodiments, the non-display information path includes two or more optical powers. For example, some embodiments may use the two or more optical powers for correction of presbyopia or for enabling the eye to properly focus for two or more distances other than the display path.

Figure 2B:
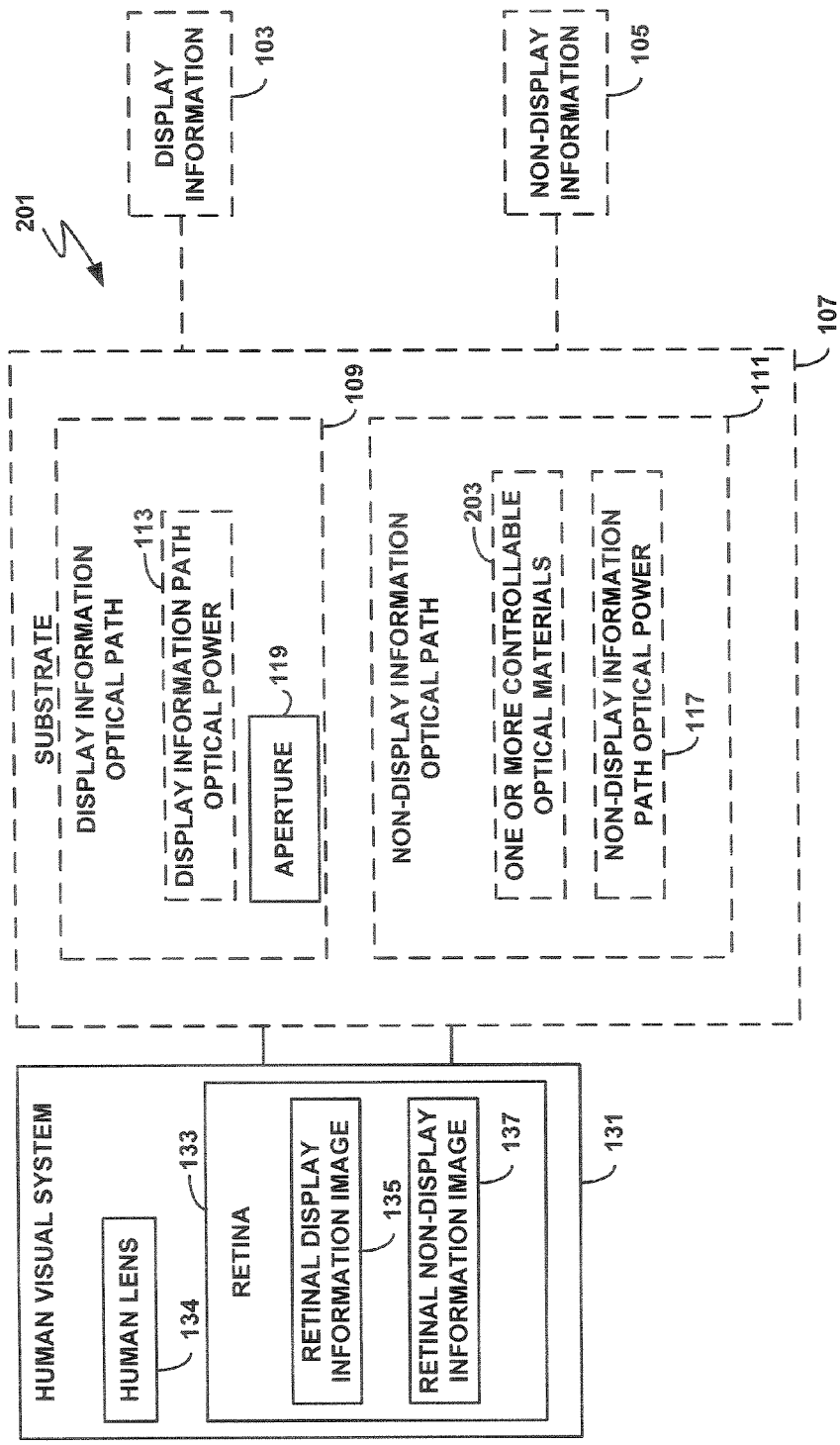
FIG. 2B is a block diagram of the example apparatus (shown in FIG. 2A) coupled to the human visual system (shown in FIG. 1D) in accordance with some embodiments of the present invention.

FIG. 2B shows a block diagram of the apparatus 201 (shown in FIG. 2A) coupled to the human visual system 131 in accordance with some embodiments. The apparatus 201 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more controllable optical materials 203 and the non-display information path optical power 117.

In some embodiments, the display information optical path 109 has an aperture 119. The aperture 119 may be sized to assist in focusing the display information 103. In some embodiments, the aperture 119 is sized to increase the depth of focus in the display information optical path 109. In some embodiments, the aperture 119 has a diameter of about one millimeter.

In operation, the display information optical path 109 and the non-display information optical path 111 assist the human visual system 131 in forming a focused image of the display information 103 at the retina 133 and a focused image of the non-display information 105 at the retina 133. The display information optical path 109 in cooperation with the human visual system 131, including the human lens 134, substantially focuses the display information 103 at the retina 133 to form a retinal display information image 135. The non-display information optical path 111 in cooperation with the human visual system 131, including the human lens 134, substantially focuses the non-display information 105 at the retina 133 to form a retinal non-display information image 137. At least one of the one or more controllable optical materials 203 in the non-display information optical path 111 substantially blocks the display information 103 from entering the human visual system 131 from the non-display information optical path 111.

Figure 2C:
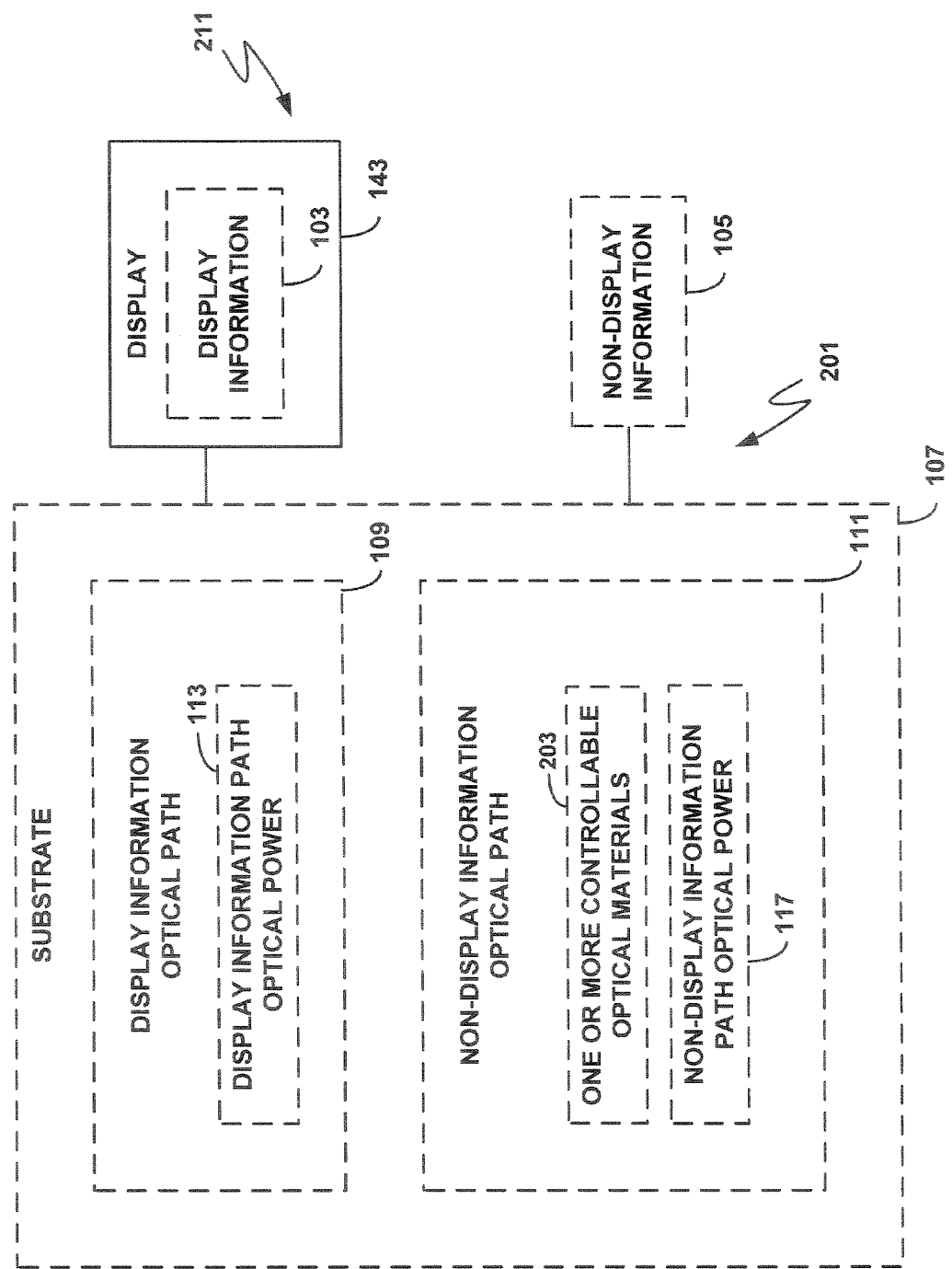
FIG. 2C is a block diagram of an example apparatus including the apparatus (shown in FIG. 2A), and further including the display (shown in FIG. 1C) to provide the display information in accordance with some embodiments

FIG. 2C shows a block diagram of an apparatus 211 including the apparatus 201 (shown in FIG. 2A), and further including the display 143 (shown in FIG. 1C) to provide the display information 103 in accordance with some embodiments. The apparatus 201 (dashed lines) includes the substrate 107 including the display information optical path 109 to receive the display information 103 and including the non-display information optical path 111 to receive the non-display information 105. The display information optical path 109 includes the display information path optical power 113. The non-display information optical path 111 includes the one or more controllable optical materials 203 and the non-display information path optical power 117. In some embodiments, the display information 103 includes information provided by the display 143.

Figure 2D:
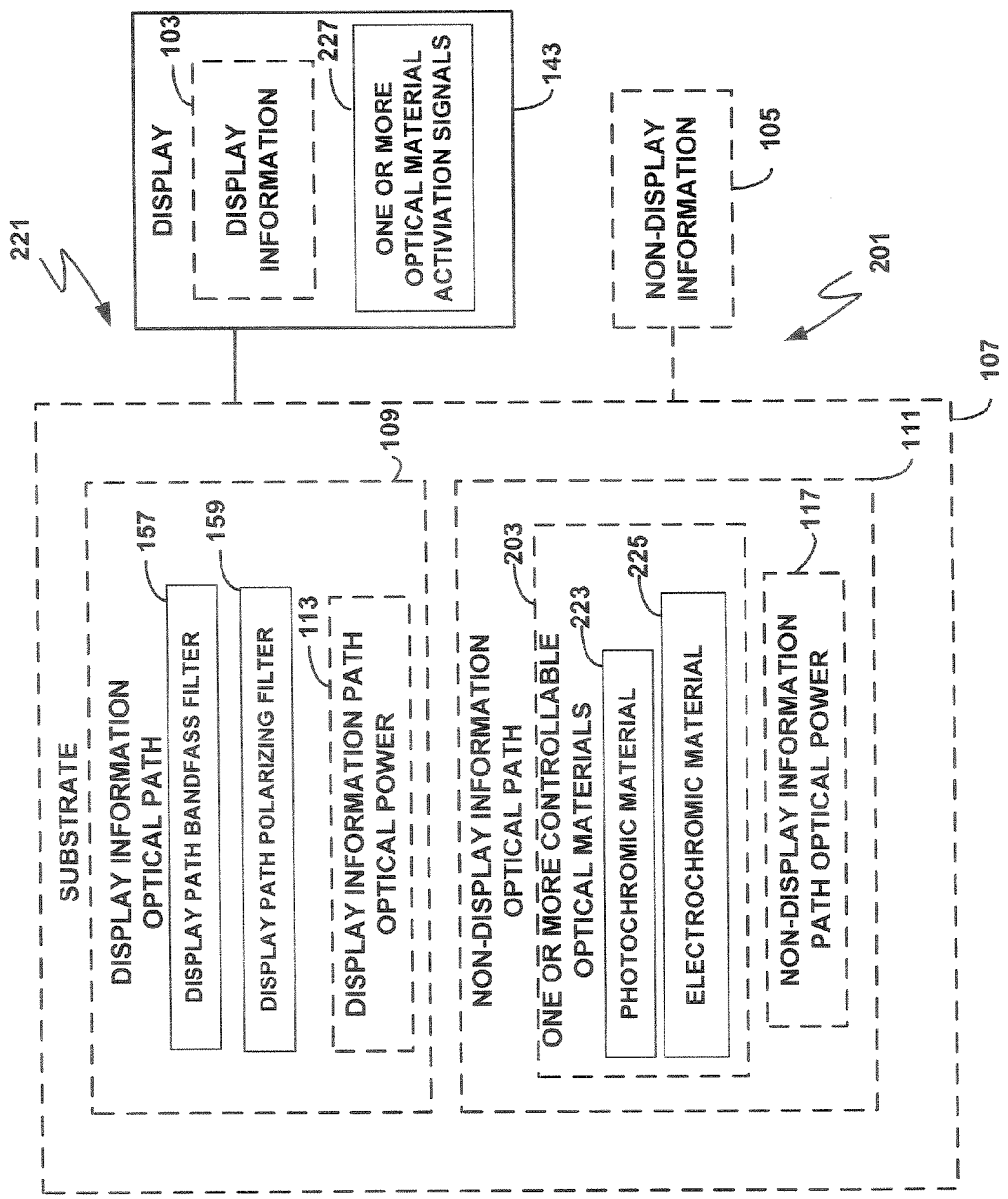
FIG. 2D is a block diagram of an example apparatus including the apparatus (shown in FIG. 2A), wherein at least one of the one or more controllable optical materials includes a photochromic material or an electrocbromic material and further including the display (shown in FIG. 1C) to provide the display information and one or more optical material activation signals in accordance with some embodiments of the present invention.

FIG. 2D shows a block diagram of an apparatus 221 including the apparatus 201 (shown in FIG. 2A), wherein at least one of the one or more controllable optical materials 203 includes a photochromic material 223 or an electrochromic material 225 and further including the display 143 to provide the display information 103 and one or more optical material activation signals 227 in accordance with some embodiments. The apparatus 201 (dashed lines) includes the substrate 107 including the display information optical path 109 to receive the display information 103 and including the non-display information optical path 111 to receive the non-display information 105. The display information optical path 109 includes the display information path optical power 113.

The non-display information optical path 111 includes the one more controllable optical materials 203 and the non-display information path optical power 117. In some embodiments, the display information optical path 109 includes the display path bandpass filter 157. In other embodiments, the display information optical path 109 includes the display path polarizing filter 159.

The one or more material activation signals 227 provide control information to the one or more controllable optical materials 203. In some embodiments, the one or more material activation signals 227 provide control information to the photochromic material 223. An optical signal is an exemplary signal suitable for use in providing control information to the photochromic material 223. In some embodiments, the one or more material activation signals 227 provide control information to the electrochromic material 225. A radio frequency signal is an exemplary signal suitable for use in providing control information to the electrochromic material 225. In some embodiments, the one or more material activation signals 227 are provided by the display 143.

In operation, one or more of the photochromic material 223 and the electrochromic material 225 are included in the non-display information optical path 111 to block or transmit information in the non-display information optical path 111. When at least one of the one or more of the photochromic material 223 and the electrochromic material 225 is set to block information in the non-display information optical path 111, substantially only display information 103 in the display information optical path 109 passes through the substrate 107.

Figure 3:
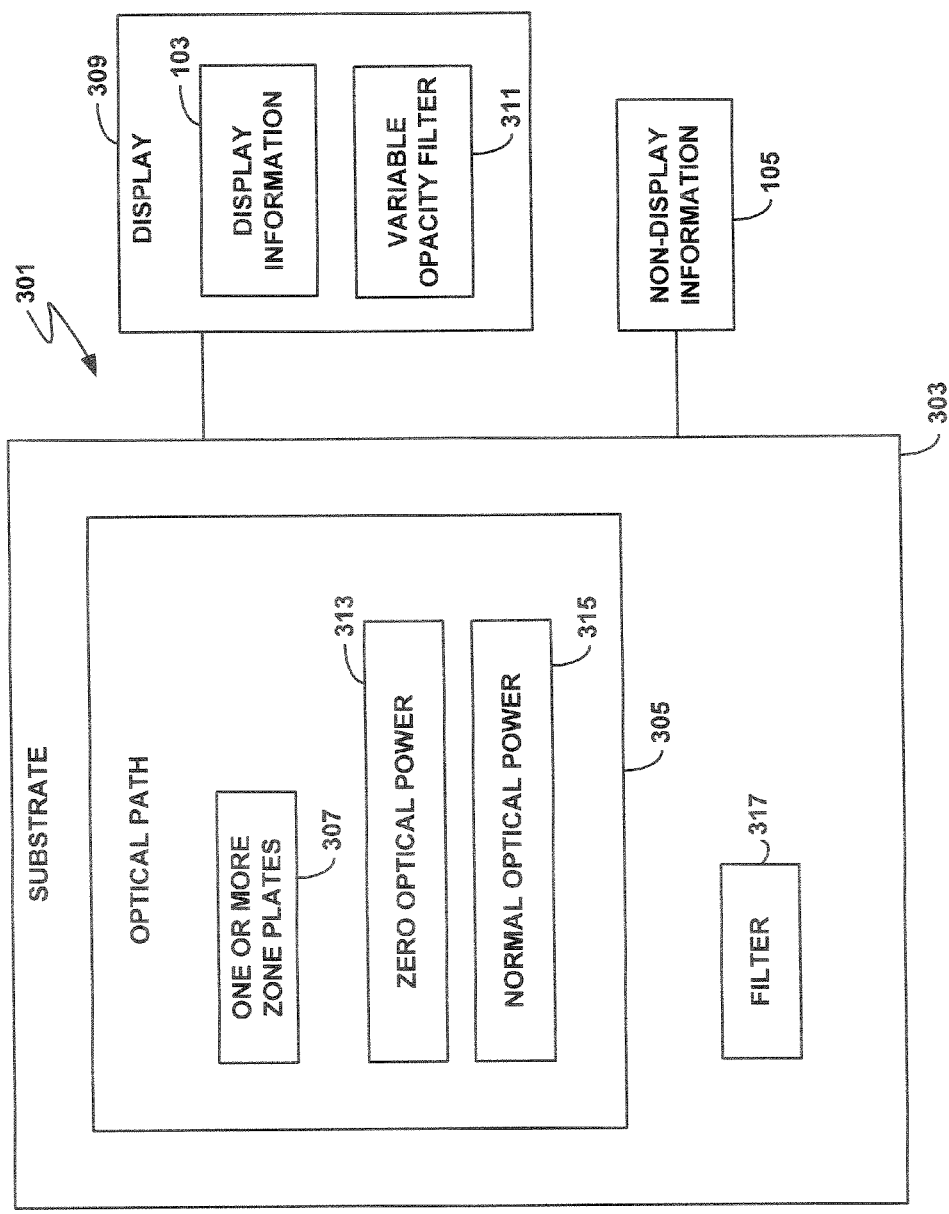
FIG. 3 is an example apparatus comprising a substrate including an optical path having one or more zone plates to receive display information and non-display information in accordance with some embodiments of the present invention.

FIG. 3 shows an apparatus 301 comprising a substrate 303 including an optical path 305 having one or more zone plates 307 to receive the display information 103 and the non-display information 105 in accordance with some embodiments.

The substrate 303 is not limited to being formed from a particular material or combination of materials. Any materials suitable for use in forming optical components, such as lenses, may be used in forming the substrate 303. Exemplary materials suitable for use in forming the substrate 303 include gels such as silicone hydrogels, glasses, plastics, and polymers such as polymethylmethacrylate and polymacon. The substrate 303 is not limited to a particular type of optical component. In some embodiments, the substrate 303 includes a lens, such as a contact lens formed from one or more of the exemplary materials.

The formation of the one or more zone plates 307 is not limited to a particular process or set of processes. In some embodiments, each of the one or more zone plates 307 is formed by patterning an interference filter, such as a rugate filter, in concentric rings in one of the one or more zone plates 307. The patterning of a rugate filter is not limited to a particular type of patterning. In some embodiments, the patterning includes binary patterning. In other embodiments, the patterning includes sinusoidal patterning. The refractive index of the rugate filter may vary continuously and periodically.

The one or more zone plates 307, in some embodiments, include three zone plates stacked substantially one on top of the other in the optical path 305 included in the substrate 303. In some embodiments, a display that provides the display information 103 includes the primary colors red, green, and blue and the one or more zone plates 307 are selected to filter the primary colors. To filter the colors red, green, and blue, one of the one or more zone plates 307 may include a rugate filter formed to filter the color red. A second of the one or more zone plates 307 may include a rugate filter formed to filter the color green, while a third of the one or more zone plates 307 may include a rugate filter formed to filter the color blue. The rugate filter formed to filter the color red includes rings that block red and rings that pass all other colors. The rugate filter for ed to filter the color green includes rings that block green and rings that pass all other colors, whereas the rugate filter formed to filter the color blue includes rings that block blue and rings that pass all other colors.

In some embodiments, the display information 103 is substantially collimated by the one or more zone plates 307. To collimate the display information 103, the one or more zone plates 307 are for ed to have a focal length of between about five and about two hundred millimeters.

In operation, the apparatus 301 processes the display information 103 and the non-display information 105 substantially simultaneously. The display information 103 is diffracted and substantially focused as the display information 103 passes through the optical path 305. The non-display information 105 passes through the optical path 305 substantially unchanged. The display information 103 and the non-display information 105 are focused to substantially the same focal point at substantially the same time. For a focal point located at a retina of a human visual system, the brain superimposes the two images.

The apparatus 301, in some embodiments, includes a display 309. In some embodiments, the display 309 provides display information 103 including display electromagnetic radiation having at least one characteristic feature. The non-display information 105 includes non-display electromagnetic radiation lacking the at least one characteristic feature. In some embodiments, the display 309 provides the display information 103 including display electromagnetic radiation having a narrow spectral bandwidth. The non-display information 105 includes non-display electromagnetic radiation having a broad spectral bandwidth. In some embodiments, the display 309 provides the display information 103 including display electromagnetic radiation having a display information polarization. The non-display information 105 includes non-display electromagnetic radiation having a non-display information polarization different from the display information polarization.

The optical path 305 is not limited to a particular optical power. In some embodiments, the optical path 305 provides substantially zero optical power 313 for the non-display information 103. In some embodiments, the optical path 305 provides a normal optical power 315 for the non-display information 105. In additional embodiments, the non-display information path includes two or more optical powers. For example, some embodiments may use the two or more optical powers for correction of presbyopia or for enabling the eye to properly focus for two or more distances other than the display path.

In some embodiments, the apparatus 301 includes a filter 317 substantially surrounding around the optical path 305. In some embodiments, when the apparatus 301 is used in combination with a human visual system, the filter 317 includes a substantially opaque filter to substantially block the display information 103 outside the optical path 305 from entering the human visual system. In some embodiments, when the apparatus 301 is used in combination with a human visual system, the filter 317 includes a non-display path polarizing filter to substantially block the display information 103 outside the optical path 305 from entering the human visual system. In some embodiments, when the apparatus 301 is used in combination with a human visual system, the filter 317 includes a notch filter to substantially block the display information 103 outside the optical path 305 from entering the human visual system.

Figures 4A, 4B:
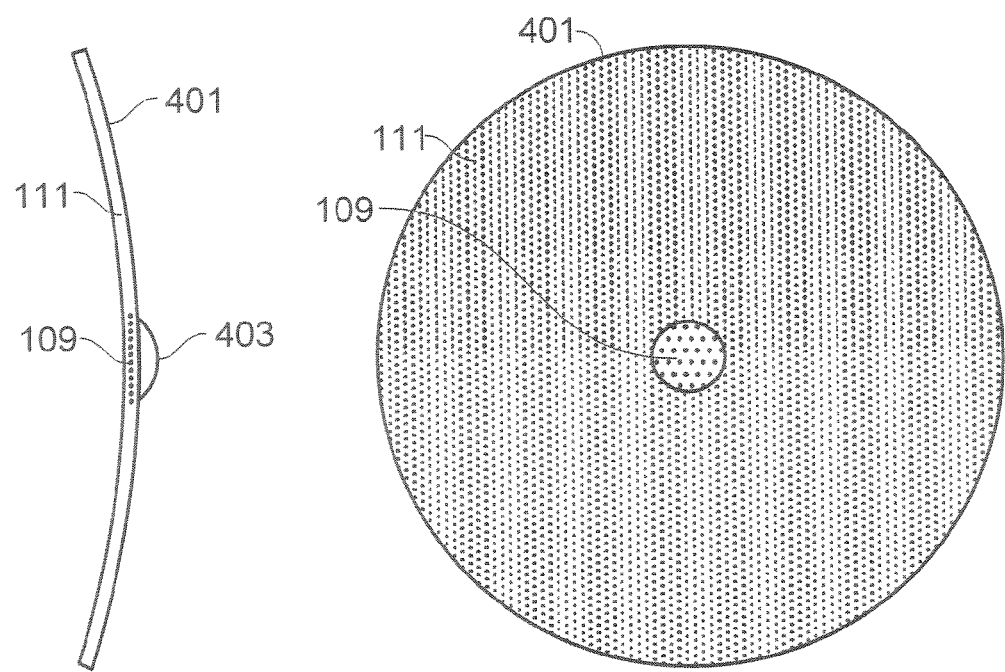
FIGS. 4A and 4B (diametrical section of contact lens shown in 4A) are illustrations of an example contact lens including the display information optical path and the non-display information optical path in accordance with some embodiments of the present invention.

FIGS. 4A and 4B (diametrical section of contact lens 401 shown in 4A) show illustrations of a contact lens 401 including the display information optical path 109 and the non-display information optical path 111 in accordance with some embodiments. The display information optical path 109 forms a substantially cylindrical path through a central area of the contact lens 401. The diameter of the display information optical path 109 may be sized to increase the depth of focus and thereby assist in focusing light from a display, such as a head-mounted display, to a retina in a wearer's visual system. In some embodiments, the display information optical path 109 includes a focusing element 403, such as a lens, to assist the wearer's visual system in focusing light rays to the retina. In some embodiments, the display information optical path 109 includes a wavelength selective filter, a polarization selective filter, or a variable opacity filter including one or more controllable optical materials such as electrochromic or photochromic materials.

The non-display information optical path 111 forms a substantially annular ring surrounding the display information optical path 109. The non-display information optical path 111 may also include a non-display information path optical power to assist the wearer's visual system in focusing light rays from objects located at a greater distance from the wearer's visual system than the display. The non-display information path optical power assists the wearer's visual system by providing an appropriate power to correct for deficiencies in the wearer's visual system. For example, for a nearsighted wearer, the non-display information optical path 111 may include an optical power to correct for the wearer's nearsightedness and permit the nearsighted wearer to clearly view objects more distant from the wearer's visual system than the display. In some embodiments, the non-display information optical path 111 includes (i) a wavelength selective filter (including a wavelength selectivity different from the selectivity of the wavelength selective filter of the display information optical path 109), (ii) a polarization selective filter (including a polarization selectivity different from the polarization selectivity of the polarization selective filter of the display information optical path 109), or (iii) a variable opacity filter.

In operation, the contact lens 401 may substantially conform to the shape of a wearer's cornea. The display information optical path 109 receives and passes or transmits light rays from the display to the wearer. The non-display information optical path 111 receives and passes or transmits light rays from objects more distant from the wearer's visual system than the display.

Figure 5:
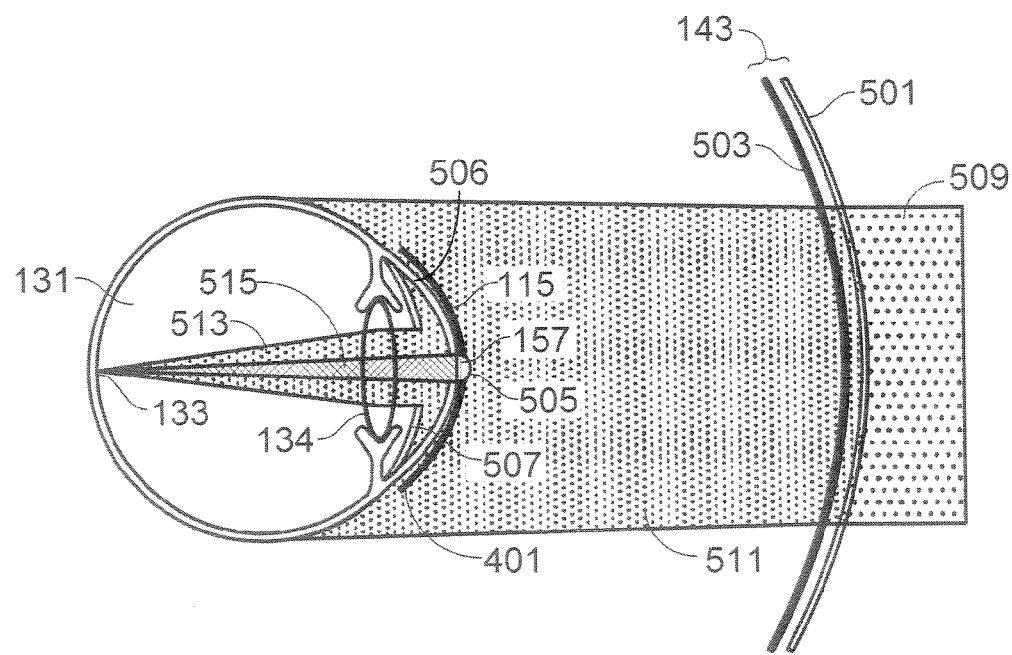
FIG. 5 is an illustration of an example display optically coupled by the contact lens to the human visual system to illustrate processing non-display information using wavelength filters in accordance with some embodiments of the present invention.

FIG. 5 shows an illustration of the display 143 optically coupled by the contact lens 401 to the human visual system 131 to illustrate processing non-display information using wavelength filters in accordance with some embodiments. In the illustrated embodiment, the display 143 includes a display notch filter 501 and an organic light emitting diode display 503. In some embodiments, the contact lens 401 includes (i) display path bandpass filter 157, such as a narrow band bandpass filter, (ii) focusing element 505 to provide display information path optical power, and (iii) one or more filters 115, such as one or more notch filters. The human visual system 131 includes a cornea 506, iris 507, the human lens 134, and the retina 133.

In operation, the light rays 509 received from objects more distant from the contact lens 401 than the display 143 encounter the display 143, the contact lens 401, and the human visual system 131. At the display 143, the display notch filter 501 filters the light rays 509. The wavelengths of the light rays 509 that correspond to the wavelength notches of display notch filter 501 are substantially removed by the display notch filter 501, allowing light rays 511 to pass. The light rays 511 pass through the display 143 substantially unaltered. At the contact lens 401, the light rays 511 are substantially blocked by the display path bandpass filter 157 and substantially passed by the one or more filters 115. At the human visual system 131, one or more of the light rays 511 pass through the iris 507 to form light rays 513. The human lens 134 focuses the light rays 513 to the retina 133.

Shadow 515 is created by the light rays blocked by the display path bandpass filter 157. The display path bandpass filter 157 slightly reduces the image intensity at the retina 133 when compared to an image formed at the retina 133 in the absence of the display path bandpass filter 157. Otherwise, the image at the retina 133 is substantially unaltered by the display path bandpass filter 157. The focusing element 505 has substantially no effect on the light rays 513 reaching the retina 133, as the light rays 511 received at the focusing element 505 are blocked by the display path bandpass filter 157.

In the absence of the display 143, a wearer of the contact lens 401 sees a normal; real world environment except that the light rays 511 now include the wavelengths substantially blocked by the display notch filter 501 when the display 143 is in use. At the contact lens 401, the wavelengths blocked at the display notch filter 501 when the display 143 is in use are passed by the display path bandpass filter 157 and defocused by the focusing element 505.

Figure 6:
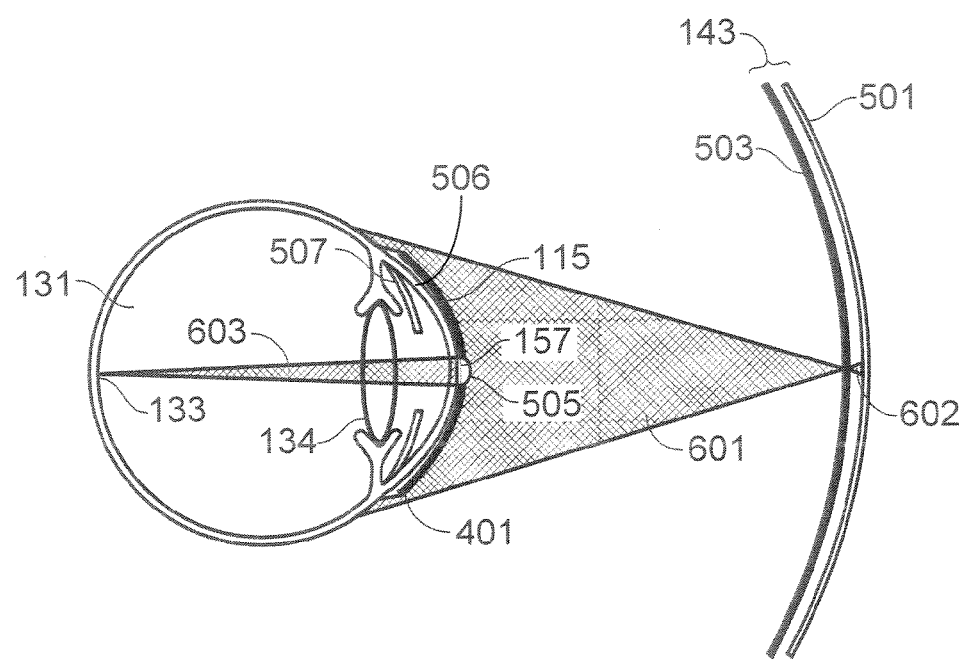
FIG. 6 is an illustration of an example display optically coupled by the contact lens to the human visual system to illustrate processing display information using wavelength filters in accordance with some embodiments of the present invention.

FIG. 6 shows an illustration of the display 143 optically coupled by the contact lens 401 to the human visual system 131 to illustrate processing display information using wavelength filters in accordance with some embodiments. The display 143 includes the display notch filter 501 and the organic light emitting diode display 503. The contact lens 401 includes (i) the display path bandpass filter 157, such as a narrow bandwidth bandpass filter, (ii) the focusing element 505 to provide display information path optical power, and (iii) the one or more filters 115. The human visual system 131 includes the cornea 506, iris 507, the human lens 134, and the retina 133.

In operation, light rays 601 and 602 are provided by the organic light emitting diode display 503. The light rays 602 are blocked by the display notch filter 501. Thus, the light rays 602 are not visible to a viewer looking at a wearer of the contact lens 401. The light rays 601 are received at the contact lens 401 and the human visual system 131. The light rays 601 are blocked by the one or more filters 115, for example, a notch filter, but are passed as light rays 603 by the display path bandpass filter 157. The focusing element 505, such as a focusing lens, provides optical power to assist the human lens 134 to focus the light rays 603 to the retina 133. The light rays 603 are substantially unaffected by the iris 507.

In some embodiments, the display 143 is occluded or partially occluded. In such embodiments, a material having an opacity is included in the display 143 to provide the occlusion or partial occlusion. When the material is included in the display 143 on the side of display 143 facing away from the contact lens 401, some or all of the non-display information or ambient light rays are blocked. In such embodiments, the display notch filter 501 is not required.

Figure 7:
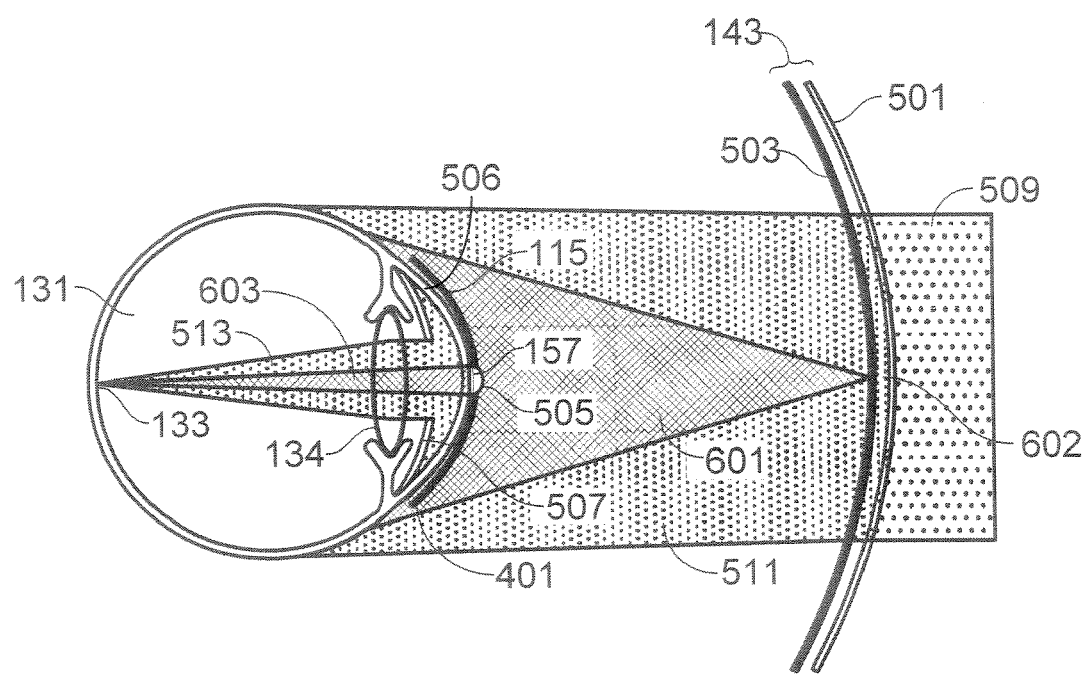
FIG. 7 is an illustration of an example display optically coupled by the contact lens to the human visual system to illustrate processing to combine non-display information and display information using wavelength filters in accordance with some embodiments of the present invention.

FIG. 7 shows an illustration of the display 143 optically coupled by the contact lens 401 to the human visual system 131 to illustrate processing to combine non-display information and display information using wavelength filters in accordance with some embodiments. The display 143 includes the display notch filter 501 and the organic light emitting diode display 503. The contact lens 401 includes the display path bandpass filter 157, the focusing element 505 to provide display information path optical power, and the one or more filters 115. The human visual system 131 includes the cornea 506, iris 507, the human lens 134, and the retina 133.

In operation, the light rays 509 received from objects more distant from the contact lens 401 than the display 143 are processed as described above in the description of FIG. 5 to provide light rays 511 and 513. The light rays 601 and 602 provided by the display 143 are processed as described above in the description of FIG. 6 to provide light rays 603. The light rays 603 come to a focus at substantially the same spot on the retina 133 as the light rays 513. The wearer's brain combines the retinal images provided by the light rays 603 and the light rays 809 to form a superimposed image.

Figure 8:
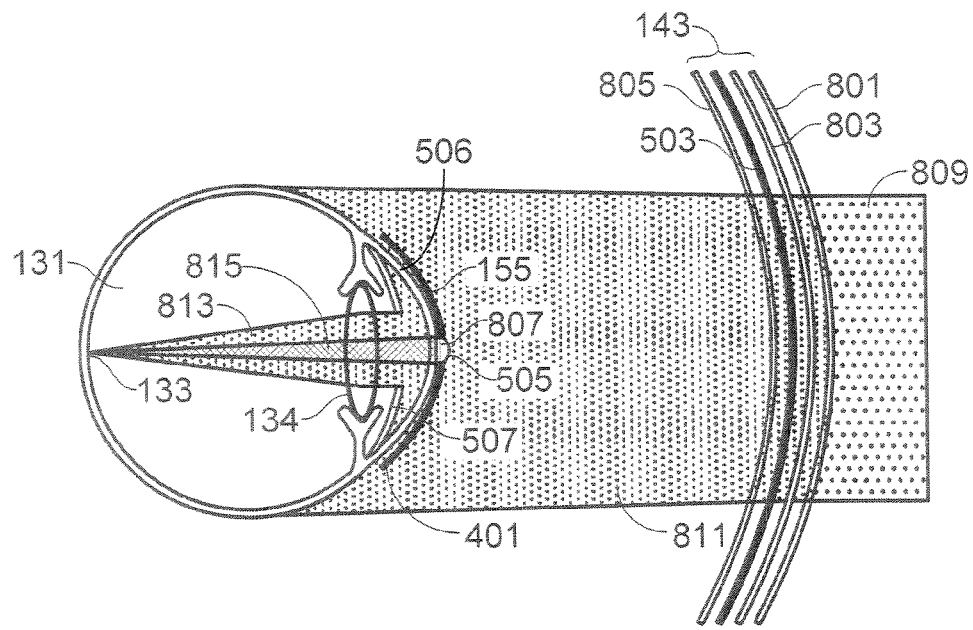
FIG. 8 is an illustration of an example display optically coupled by the contact lens to the human visual system to illustrate processing non-display information using polarizing filters in accordance with some embodiments of the present invention.

FIG. 8 shows an illustration of the display 143 optically coupled by the contact lens 401 to the human visual system 131 to illustrate processing non-display information using polarizing filters in accordance with some embodiments. The display 143 includes the organic light emitting diode display 503, a display polarizing filter 801, and display shutters 803 and 805. The contact lens 401 includes a display path filter 807, such as a display path bandpass filter or a display path polarizing filter, the focusing element 505 to provide display information path optical power, and the non-display path polarizing filter 155. The human visual system 131 includes the cornea 506, iris 507, the human lens 134, and the retina 133.

In operation, the light rays 809 are polarized by the display polarizing filter 801 to form light rays 811. The shutters 803 and 805 are switched to the same polarization as the display polarizing filter 801. Thus, the light rays 811 pass through the shutters 803 and 805 substantially unaltered. The organic light emitting diode display 503 is set to an "off" state and is therefore substantially translucent to the light rays 811. Thus, the light rays 811 also pass through the organic light emitting diode display 503 substantially unaltered. The light rays 811 are substantially blocked by the display path filter 807. In some embodiments, the display path filter 807 includes the display path bandpass filter 157 (shown in FIG. 1D). In some embodiments, the display path filter 807 includes the display path polarizing filter 159 (shown in FIG. 1D) having a polarization different from the polarization of the shutters 803 and 805. The non-display path polarizing filter 155 has the same polarization as the shutters 803 and 805. Thus, the light rays 811 pass through the non-display path polarizing filter 155 substantially unaltered. At the human visual system 131, the iris 507 limits the light rays passing through the iris 507 to light rays 813. The human lens 134 focuses the light rays 813 at the retina 133.

Shadow 815 is created by the light rays blocked by the display path filter 807. The display path filter 807 slightly reduces the image intensity at the retina 133 when compared to an image formed at the retina 133 in the absence of the display path filter 807. Otherwise, the image at the retina 133 is substantially unaltered by the display path filter 807. The focusing element 505 has substantially no effect on the light rays 811 reaching the retina 133, as the light rays 811 passing through the focusing element 505 are substantially blocked by the display path filter 807.

In the absence of the display 143, a wearer of the contact lens 401 sees a normal, real world environment except that the light rays 811 are polarized. For the display path filter 807 including either a polarizing filter or a bandpass filter, the light rays passing through the display path filter 807 are defocused by the focusing element 505 before reaching retina 133.

Figure 9:
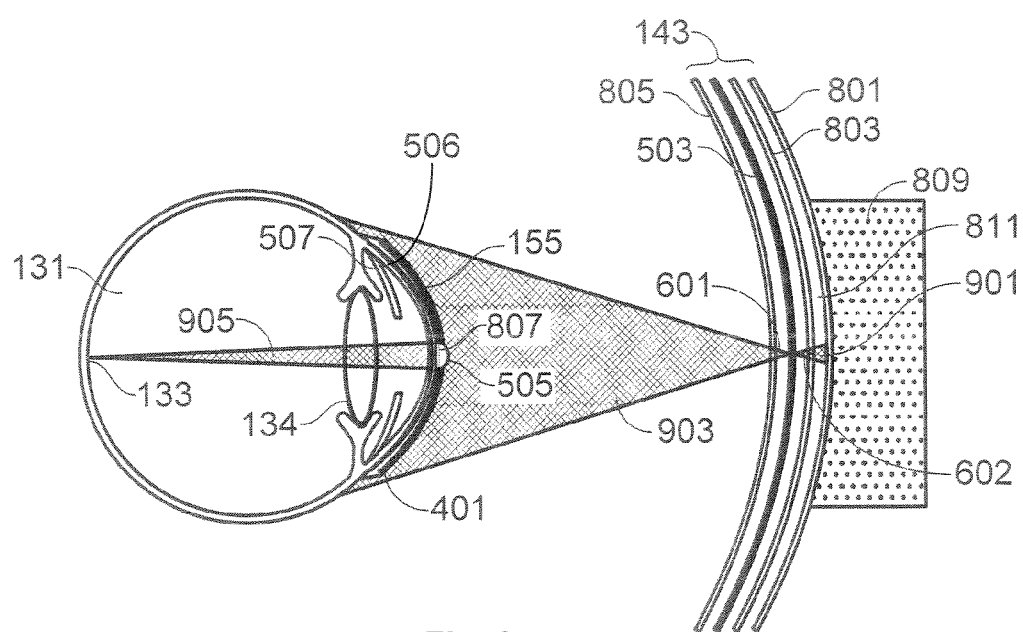
FIG. 9 is an illustration of an example display optically coupled by the contact lens to the human visual system to illustrate processing display information using polarizing filters in accordance with some embodiments of the present invention.

FIG. 9 shows an illustration of the display 143 optically coupled by the contact lens 401 to the human visual system 131 to illustrate processing display information using polarizing filters in accordance with some embodiments. The display 143 includes the display polarizing filter 801, the display shutter 803, the organic light emitting diode display 503, and the display shutter 805. The contact lens 401 includes the non-display path polarizing filter 155, the display path filter 807, such as a display path bandpass filter or a display path polarizing filter, and the focusing element 505 to provide display information path optical power. The human visual system 131 includes the cornea 506, iris 507, the human lens 134, and the retina. 133.

In operation, the display polarizing filter 801 polarizes the light rays 809 to form light rays 811. The shutter 803 is switched to a polarization to substantially block the light rays 811, and the organic light emitting diode display 503 is set to an "on" state. The organic light emitting diode display 503 provides the light rays 601 and 602, while the shutter 803 polarizes the light rays 602 to form light rays 901. The display polarizing filter 801 is set to a polarization to substantially block the light rays 901. Thus, the light rays 901 are not visible to a viewer looking at a wearer of the display 143. The shutter 805 polarizes the light rays 601 to form light rays 903. The non-display path polarizing filter 155 is set to a polarization to substantially block the light rays 903. For the display path filter 807 set to substantially the same polarization as the shutter 805, the display path filter 807 passes the light rays 903 substantially unaltered. The focusing element 505, such as a focusing lens, provides optical power to assist the human lens 134 to focus the light rays 905 to the retina 133. Thus, the focusing element 505 may provide an optical power to assist the human lens 134 in focusing the light rays 903 at the retina 133. The human lens 134 in combination with the focusing element 505 processes the light rays 903 to form light rays 905. The iris 507 has substantially no effect on the light rays 905 substantially focused at the retina 133.

If the display 143 is occluded or partially occluded, the display polarization filter 801 is not required. Instead, in some embodiments, a material having an opacity is included on the side of the display 143 facing away from the contact lens 401 to block some or all of the light rays 809 including the non-display information.

In some embodiments, a quarter wave-plate is included in the shutter 805 to convert the light rays 601 having a linear polarization to a circular polarization. To support the processing of circularly polarized radiation, the non-display path polarizing filter 155 includes a filter to provide transmission of right-handed circularly polarized radiation. Also, to support the processing of circularly polarized radiation, the display path filter 807 includes a filter to provide transmission of left-handed circularly polarized radiation. In operation, to process the non-display information, the shutter 805 including the quarter wave-plate is set to pass right-handed circularly polarized radiation. In operation, to process the display information the shutter 805 including the quarter wave plate is set to pass left-handed circularly polarized radiation. In some embodiments, the display path filter 807 includes a display path bandpass filter.

A filter providing transmission of circularly polarized radiation, unlike a filter providing for transmission of linearly polarized radiation, does not require rotational alignment of the contact lens 401 with the human visual system 131. However, the non-display path polarizing filter 155 is not limited to a filter for processing circularly polarized radiation. In some embodiments, the non-display path polarizing filter 155 includes a filter to provide transmission of linearly polarized radiation.

Referring to FIG. 8 and FIG. 9, in some embodiments the shutters 803 and 805 are switched between one polarization state and another polarization state in synchronization with the setting of the organic light emitting diode display 503 to an "on" state and an "off" state. For example, when the organic light emitting diode display 503 is set to an "on" state, the shutters 803 and 805 are switched to the state as described for FIG. 9 to process the display information provided by the light rays 601 and 602 from the organic light emitting diode display 503. And, for example, when the organic light emitting diode display 503 is set to an "off" state, the shutters 803 and 805 are switched to the state as described for FIG. 8 to process non-display information provided by the light rays 809. The switching rate is set to a frequency that allows the brain of a wearer of the contact lens 401 to form a single image from the superposition of the images of the display information and the non-display information.

Polarizing shutters, such as shutters 803 and 805, can utilize liquid crystal display panels that re-orient their liquid crystals in response to an applied electric field. When the crystals are oriented in one direction, they pass electromagnetic radiation having a particular polarization. Changing the electric field to orient the crystals in a second direction causes electromagnetic radiation having a second polarization to be passed.

Figures 10A, 10B:
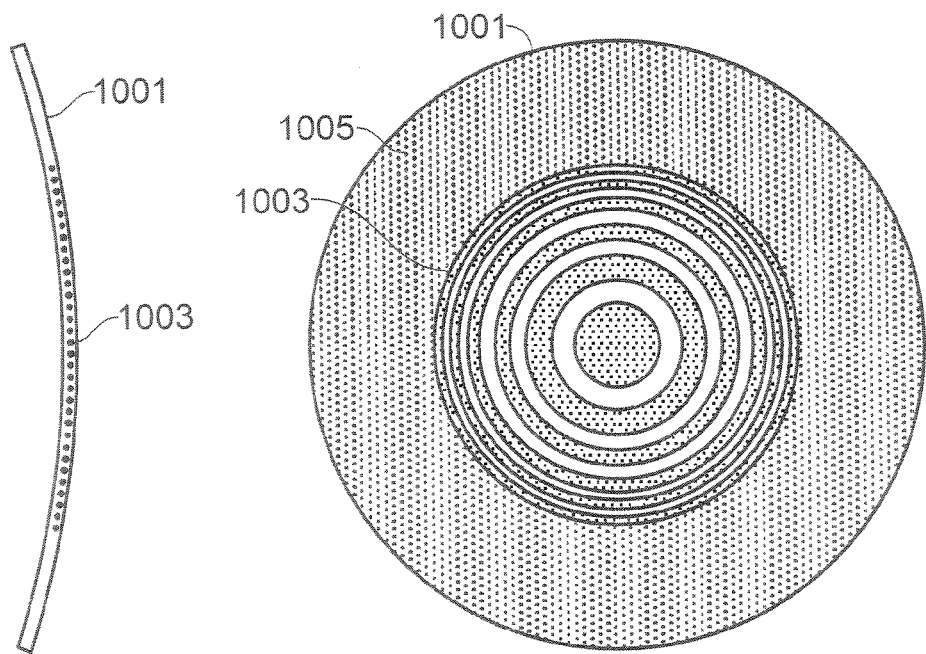
FIGS. 10A and 10B (diametrical section of illustration shown in 10A) are illustrations of an example contact lens including one or more zone plate filters in accordance with some embodiments of the present invention.

FIGS. 10A and 10B (diametrical section of illustration shown in FIG. 10A) show illustrations of a contact lens 1001 including one or more zone plate filters 1003 in accordance with some embodiments. In certain embodiments, the one or more zone plate filters 1003 are formed by patterning a rugate filter in concentric rings of a diffraction zone plate, which focuses light using diffraction to cause constructive interference at a focal point to create an image. A rugate filter includes optical interference films of varying thickness. The refractive index of the optical interference film varies as a function of the film's optical thickness. The use of a rugate filter in forming a zone plate results in a zone plate that operates on a particular set of wavelengths, for example, a narrow band of wavelengths. In some embodiments, the patterning of the zone plate is binary. Binary patterning includes substantially opaque and transparent rings of substantially equal areas. In some embodiments, the patterning is sinusoid. Sinusoid patterning includes rings having substantially gradual variations in opacity. In some embodiments, the contact lens 1001 includes a notch filter 1005 forming substantially an annular ring around the one or more zone plate filters 1003.

Figure 11:
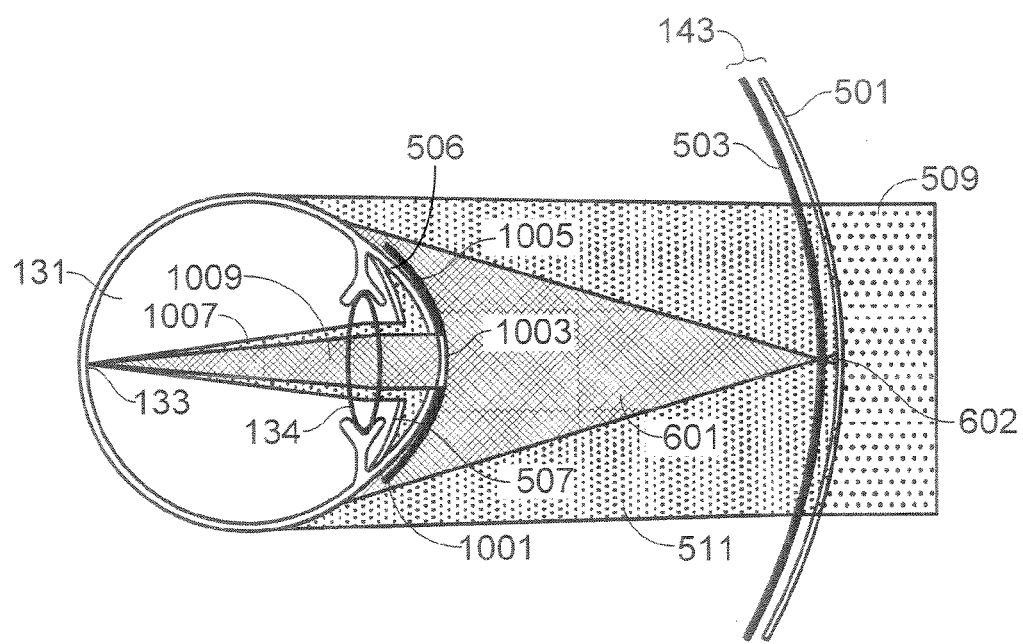
FIG. 11 is an illustration of an example display optically coupled by the contact lens to the human visual system to illustrate processing display information and non-display information using the one or more zone plate filters in accordance with some embodiments of the present invention.

FIG. 11 shows an illustration of the display 143 optically coupled by the contact lens 1001 to the human visual system 131 to illustrate processing display information and non-display information using the one or more zone plate filters 1003 in accordance with some embodiments. The display 143 includes the display notch filter 501 and the organic light emitting diode display 503. The contact lens 1001 includes the one or more zone plate filters 1003. In some embodiments, the contact lens 1001 includes the notch filter 1005. The human visual system 131 includes the cornea 506, iris 507, the human lens 134, and the retina 133.

In operation, the light rays 509 providing non-display information received from objects more distant from the contact lens 1001 than the display 143 encounter the display 143, the contact lens 1001, and the human visual system 131. At the display 143, the display notch filter 501 filters the light rays 509. The wavelengths of the light rays 509 that correspond to the wavelength notches of the display notch filter 501 are substantially removed by the display notch filter 501, passing the light rays 511. The light rays 511 pass through the display 143 substantially unaltered. At the contact lens 1001, the light rays 511 pass through the one or more zone plate filters 1003 and the notch filter 1005 substantially unaltered. At the human visual system 131, the iris 507 may block some of the light rays 511, passing light rays 1007. The human lens 134 focuses the light rays 1007 including the non-display information at the retina 133.

In operation, the organic light emitting diode display 503 provides light rays 601 and 602. The light rays 602 are directed away from the contact lens 1001 and are substantially blocked by the display notch filter 501. Thus, the light rays 602 are not visible to a viewer looking at a wearer of the display 143. The light rays 601 are directed toward the contact lens 1001 including the notch filter 1005 and the one or more zone plate filters 1003. At the notch filter 1005, the light rays 601 are substantially blocked. At the one or more zone plate filters 1003, the light rays 601 are diffracted to form the light rays 1009. The human lens 134 focuses the light rays 1009 including the display information at the retina 133.

The light rays 509 received from objects more distant from the contact lens 1001 than the display 143 are processed as described above to provide the light rays 1007 including the non-display information to the retina 133. The light rays 601 provided by the display 143 are processed as described above to provide the light rays 1009 including the display information to the retina 133. The light rays 1007 and the light rays 1009 are focused at substantially the same spot at the retina 133 at substantially the same time. Thus, the brain of the wearer of the contact lens 1001 combines the retinal image provided by the light rays 1007 including the non-display information and the retinal image provided by the light rays 1009 including the display information to form a superimposed image including the display information and the non-display information.

In the absence of the display 143, a wearer of the contact lens 1001 sees a normal, real world environment except the light rays 511 now include the wavelengths substantially blocked by the display notch filter 501. At the contact lens 1001, the wavelengths blocked at the display notch filter 501 when the display 143 is present are diffracted by the one or more zone plate filters 1003 and defocused by the human lens 134.

If the display 143 is occluded or partially occluded, the display notch filter 501 is not required. Instead, in some embodiments, a material having an opacity is included on the side of the display 143 facing away from the contact lens 1001 to block some or all of the light rays 509 including the non-display information.

Figure 12:
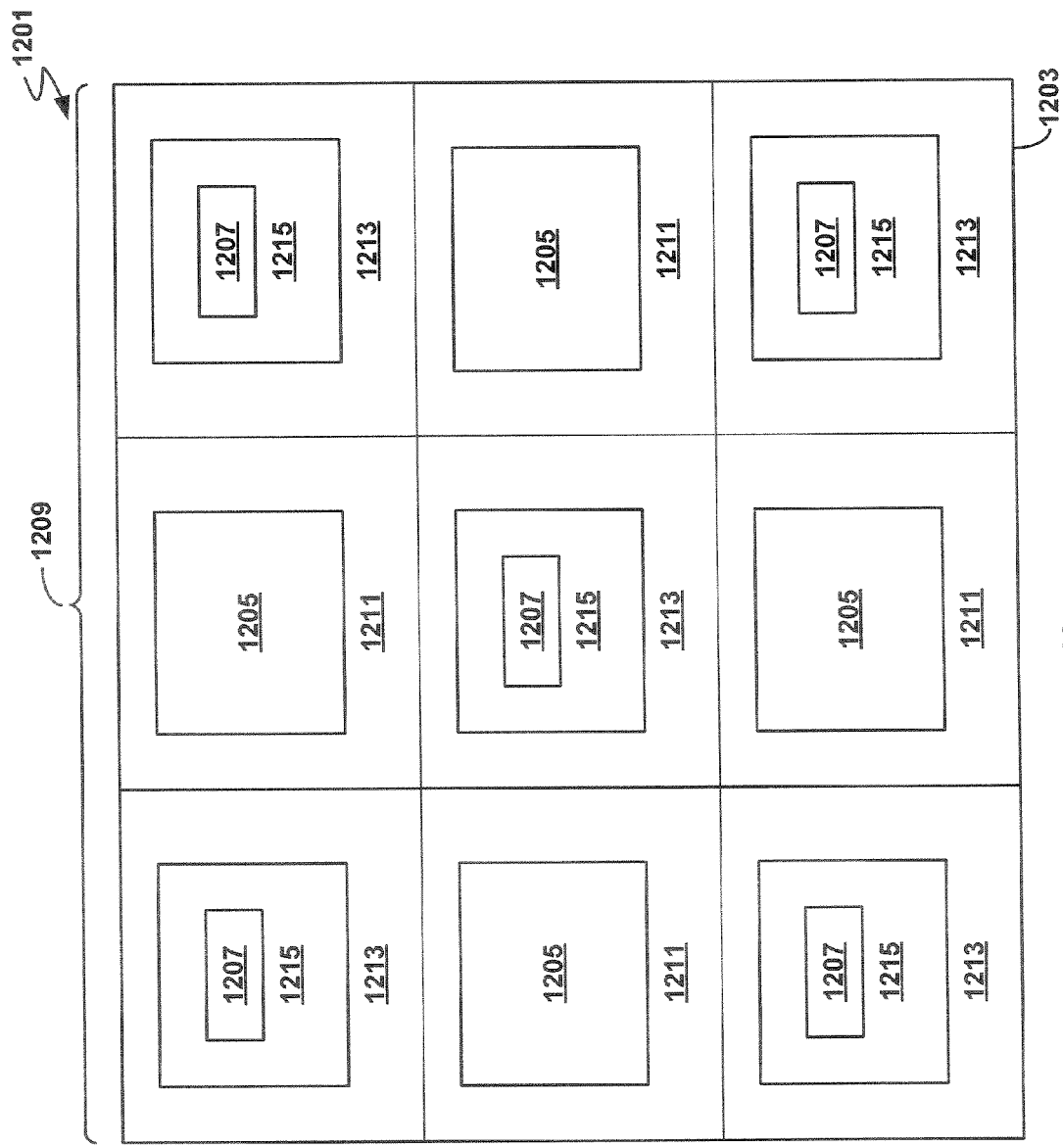
FIG. 12 is an illustration of an example apparatus including a substrate, a substantially transparent pixel unit, and an organic light emitting diode (OLED) unit in accordance with some embodiments of the present invention.

FIG. 12 shows an illustration of an apparatus 1201 including a substrate 1203, a substantially transparent pixel unit 1205, and an organic light emitting diode unit 1207 in accordance with some embodiments. The substrate 1203 includes a pattern 1209 of pixel sites including a first pattern of one or more first pixel sites 1211 and a second pattern of one or more second pixel sites 1213. The substantially transparent pixel unit 1205 is located at substantially each of the one or more first pixel sites 1211. The organic light emitting diode pixel unit 1207 including a filter 1215 is located at substantially each of the one or more second pixel sites 1213. The filter 1215 is located on the substrate 1203 to enable filtering of the electromagnetic radiation emitted by the organic light emitting diode unit before the electromagnetic radiation reaches a viewer. To filter the electromagnetic radiation, such as visible light, emitted by the organic light emitting diode pixel unit 1207, the area of the filter 1215 is substantially equal to or greater than the area of the organic light emitting diode pixel unit 1207. In some embodiments, the filter 1215 is a narrow band filter. In other embodiments, the filter 1215 is a polarizing filter. The pattern 1209 of pixel sites is not limited to a particular pattern. In some embodiments, the pattern 1209 of pixel sites includes a checkerboard pattern including the first pattern of the one or more first pixel sites 1211 alternating with the second pattern of the one or more second pixel sites 1213. The sites are not limited to a particular shape and the shapes shown are only for schematic illustration.

Figure 13:
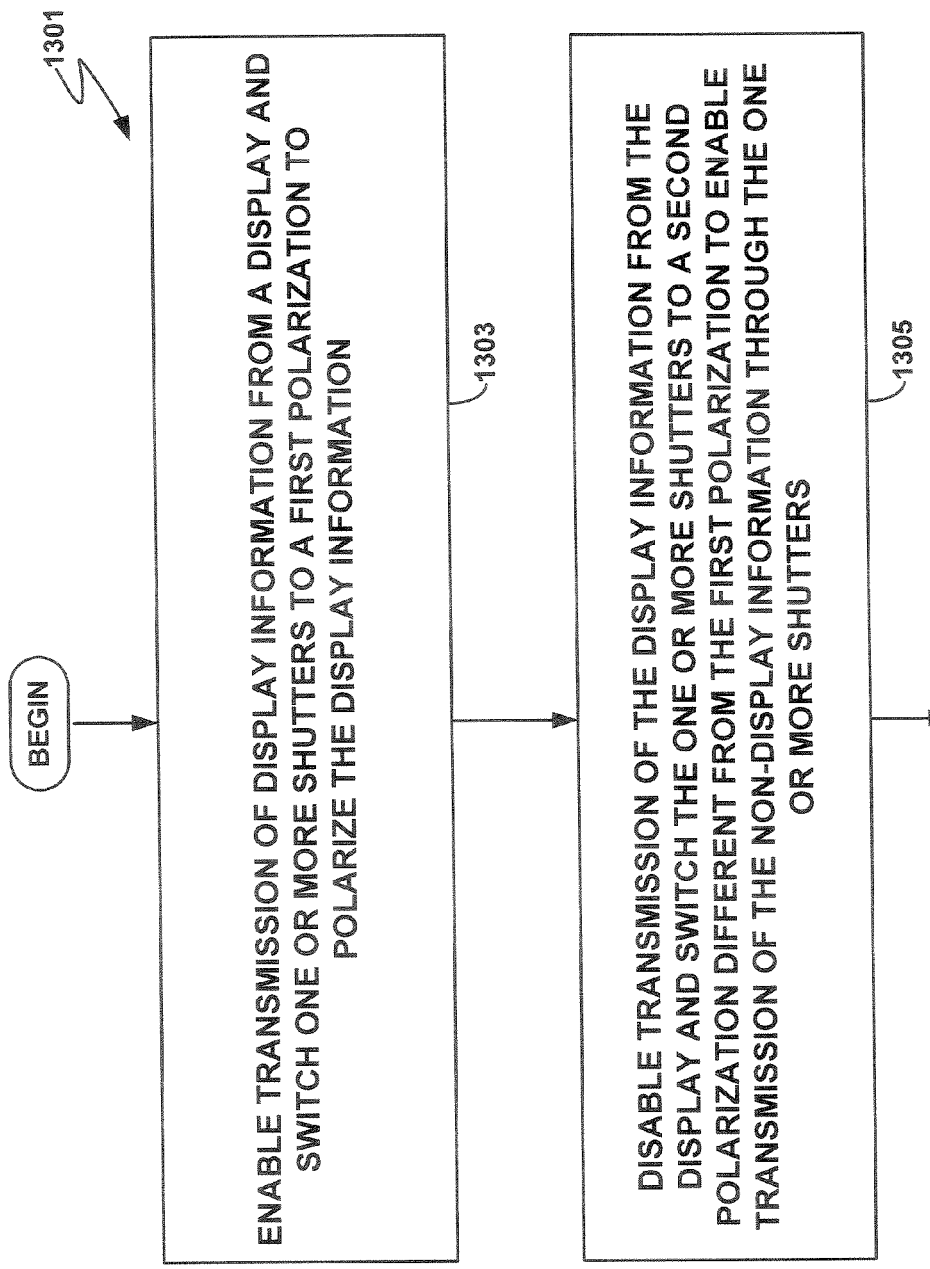
FIG. 13 is a flow diagram of an example method including enabling and disabling transmission of display information and transmission of non-display information in accordance with some embodiments of the present invention.

FIG. 13 shows a flow diagram of a method 1301 including enabling and disabling transmission of display information and transmission of non-display information in accordance with some embodiments. In the illustrated embodiment, the method 1301 enables transmission of display information from a display and switches one or more shutters to a first polarization to polarize the display information (block 1303). The method 1301 also disables transmission of the display information from the display and switches the one or more shutters to a second polarization different from the first polarization to enable transmission of the non-display information through the one or more shutters (block 1305). In some embodiments, the method 1301 includes receiving the display information and the non-display information at a contact lens. In some embodiments, the method 1301 includes substantially blocking the display information at a non-display information optical path included in the contact lens and substantially transmitting the display information at a display information optical path included in the contact lens.

Figure 14:
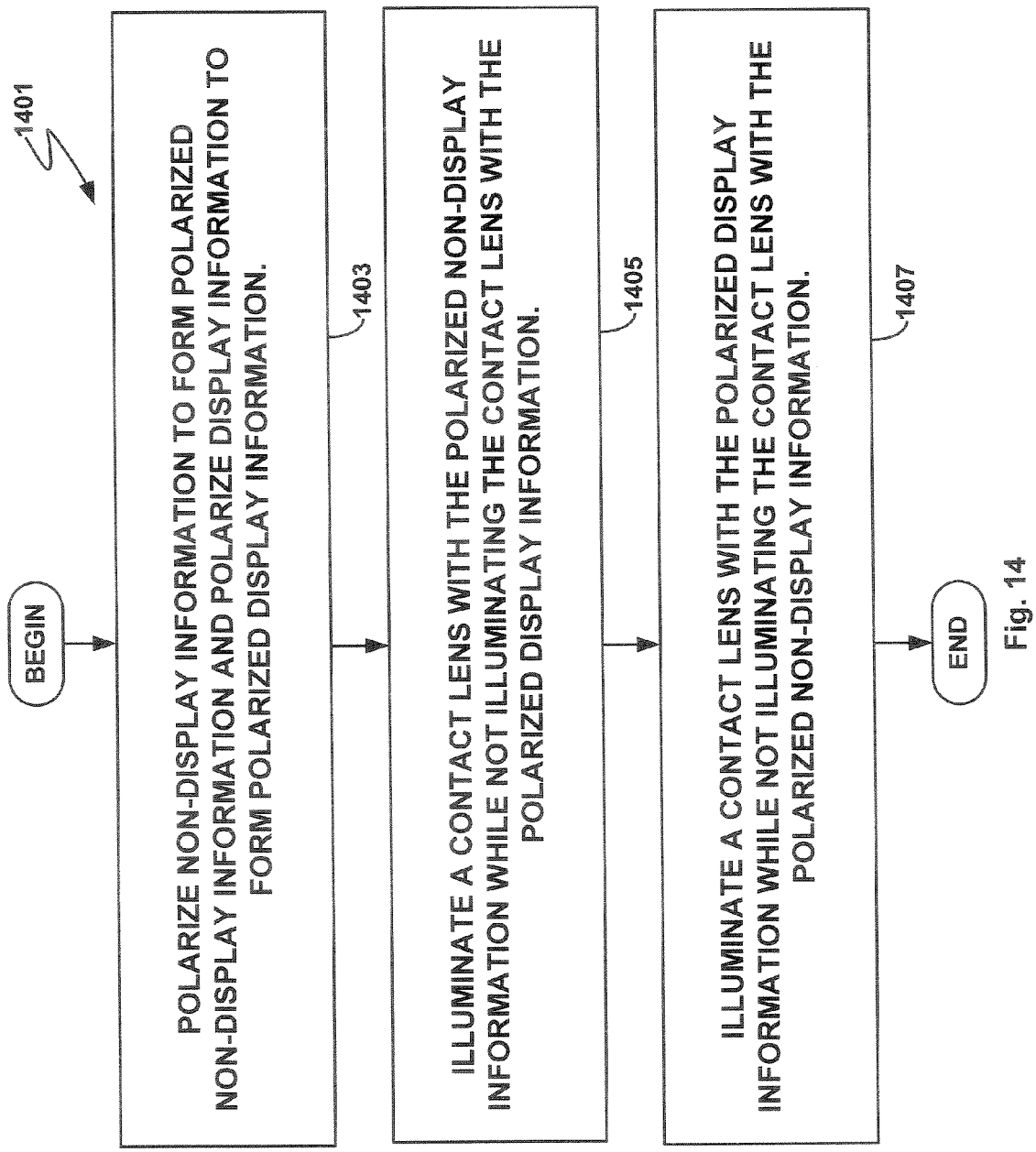
FIG. 14 is a flow diagram of an example method including polarizing display and non-display information and illuminating a contact lens with the polarized display and non-display information in accordance with some embodiments of the present invention.

FIG. 14 shows a flow diagram of a method 1401 including polarizing display and non-display information and illuminating a contact lens with the polarized display and non-display information in accordance with some embodiments. In the illustrated embodiment, the method 1401 (i) polarizes non-display information to form polarized non-display information and polarizes display information to form polarized display information (block 1403), (ii) illuminates a contact lens with the polarized non-display information while not illuminating the contact lens with the polarized display information (block 1405), and (iii) illuminates the contact lens with the polarized display information while not illuminating the contact lens with the polarized non-display information (block 1407). In some embodiments, the method 1401 includes substantially blocking the polarized display information at the non-display information path at the contact lens.

Figure 15:
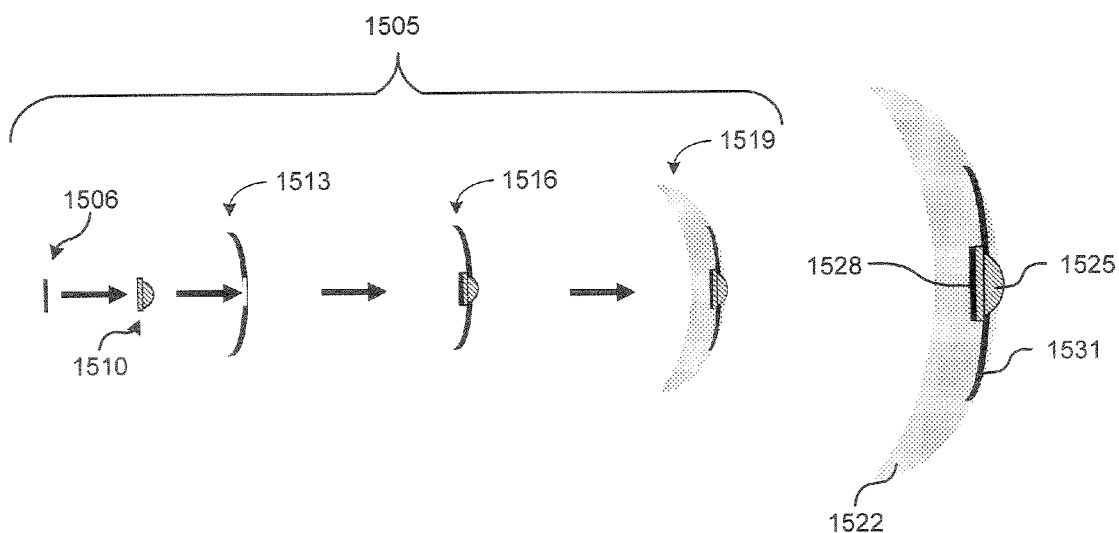
FIG. 15 is an illustration of an example construction of a contact lens assembly with a molded refractive lens in accordance with one embodiment of the present invention.

FIG. 15 illustrates an example construction of a contact lens assembly in accordance with one embodiments of the invention. The contact lens assembly as illustrated comprises a first filter 1531, a lenslet 1525, a filter 1528, and a polymerized soft lens 1522. In some embodiments, the first filter 1531 is a curved polymer polarizer filter, while the filter 1528 is a narrow band optical bandpass filter. In further embodiments, the filter 1528 disposed on the lenslet 1525 is a RGB bandpass filter or a polarizer filter.

Referring now to the lenslet 1525, in some embodiments, the lenslet 1525 may be configured to enable imaging of near objects, such as a display image emitted from a near-eye display panel. For such embodiments, the lenslet 1525 may be a refractive lens (as shown), or a diffractive lens (not shown). Furthermore, in some embodiments, the lenslet 1525 may be substantially wider in a horizontal direction than in vertical direction, thereby allowing for wider viewing angles in the horizontal direction.

Continuing with reference to FIG. 15, process 1505 illustrates an example method for construction of a contact lens assembly such as the one described above. The contact lens construction begins at either stage 1506 with the creation of a filter 1528, or stage 1510 with the creation of a lenslet 1525. The lenslet and the filter may be created by any number of conventional methods known by those skilled in the art. At stage 1513, a curved filter 1531 having an aperture is created. In some embodiments, this curved filter 1531 is created with an aperture sufficient in size to allow for some or all of lenslet 1525 to be disposed through it, as illustrated in stage 1516.

Once filter 1528 is disposed on to the lenslet 1525, the lenslet 1525 is disposed through the curved filter 1531 at stage 1519. In some embodiments, this filter 1528 is a RGB bandpass filter or a polarizer filter. Additionally, in some embodiments, the lenslet 1525 is first formed and then disposed through the curved filter 1531 such that the filter 1528 is not in contact with the curved filter 1531.

Continuing with stage 1519, the assembly comprising the curved filter 1531, the lenslet 1525, and the filter 1528 is disposed within a mold containing pre-polymerized material, such as hydro-gel. The material is subsequently cured, thereby forming a polymerized soft lens 1522.

Figure 16:
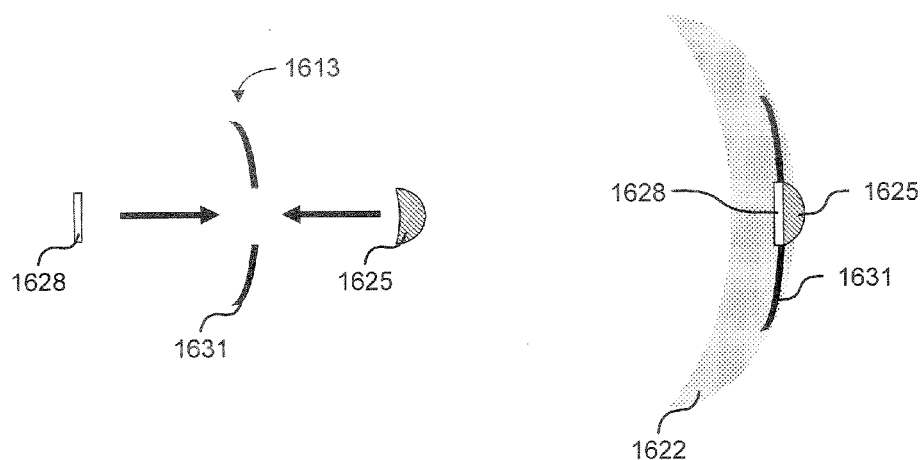
FIG. 16 is an illustration of an example construction of a contact lens assembly with a molded refractive lens in accordance with one embodiment of the present invention.

FIG. 16 illustrates another example construction of a contact lens assembly in accordance with one embodiment of the invention. Referring now to FIG. 16, the contact lens assembly comprises a first filter 1631, a lenslet 1625, a second filter 1628, and a soft lens 1622. In some embodiments, the first filter 1631 is a curved polymer polarizer filter having a first polar orientation, while the second filter 1628 is a polarizer filter having a second polar orientation (e.g., 90 degree rotation).

In further embodiments, the second filter 1628 is attached to the molded lenslet 1625 to form a lenslet assembly that may be wholly or partially disposed through an aperture of the first filter 1631. Depending on the embodiment, the molded lenslet 1625 may be molded or bonded onto the second filter 1628. Furthermore, when manufacturing some embodiments, the placement of the lenslet assembly through the aperture of the first filter 1631 and the attachment of the second filter 1628 to the molded lenslet 1625 may occur substantially simultaneously (as illustrated in stage 1613).

In alternative embodiments not illustrated, the molded lenslet is attached to a curved gas-permeable substrate that is patterned as a filter in one or more locations. For example, in one such embodiment, a first filter similar in location to filter 1631 is created by patterning that area of the curved gas-permeable substrate as a first filter (e.g., RGB notch filter). In further such embodiments, a second filter similar in location to filter 1628 is created by patterning that area of the curved gas-permeable substrate as a second filter (e.g., RGB bandpass filter). A number of known methods known in the art can utilized in patterning a filter onto the substrate, including photolithography.

With further reference to lenslet 1625, in some embodiments, the lenslet may be configured to enable imaging of near objects, such as a display image emitted from a near-eye display panel. For such embodiments, the lenslet 1625 may be a refractive lens (as shown), or a diffractive lens (not shown). Further, in some embodiments, the lenslet 1625 may be created to be substantially wider in a horizontal direction than in vertical direction, thereby allowing for wider viewing angles in the horizontal direction.

Figure 17:
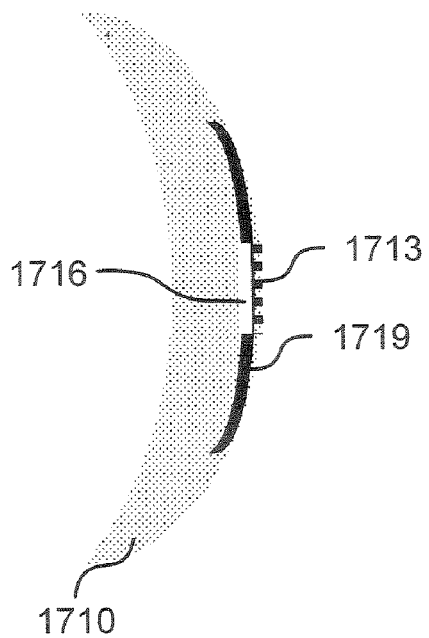
FIG. 17 is an illustration of an example construction of a contact lens assembly with a diffractive lens in accordance with one embodiment of the present invention.

FIG. 17 illustrates an example construction of a contact lens assembly with a diffractive lens in accordance with one embodiment of the present invention. Referring now to FIG. 17, the illustrated contact lens assembly comprises a first filter 1719, a diffractive lenslet 1713, a second filter 1716, and a polymerized soft lens 171 0. As discussed earlier in some embodiments, the first filter 1719 can be a RGB notch filter patterned onto a curved gas-permeable substrate, while the second filter 1716 can be a RGB bandpass filter patterned onto the same curved gas-permeable substrate.

Similar to FIG. 16, the second filter 1716 of FIG. 17 is attached to the diffractive lenslet 1713 to form a lenslet assembly that may be wholly or partially disposed through an aperture of the first filter 1719. Depending on the embodiment, the diffractive lenslet 1713 may be molded or bonded onto the second filter 1716. Furthermore, when manufacturing some embodiments, the placement of the lenslet assembly through the aperture of the first filter 1719 and the attachment of the second filter 1716 to the diffractive lenslet 1713 may occur substantially simultaneously.

It should be noted that for some embodiments similar to those shown in FIGS. 15, 16, and 17, the lenslet may be disposed within the contact lens (e.g., hydro gel lens) such that the lenslet is fully encapsulated by the contact lens's material. In such embodiments, the lenslet may have an index of refraction that is higher than that of the contact lens material encompassing it.

Figure 18:
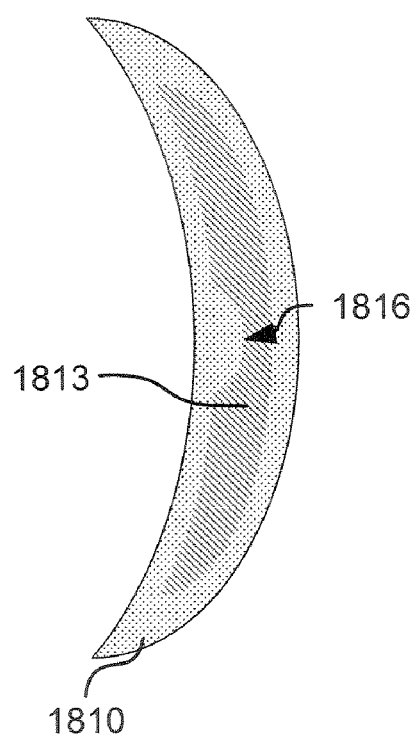
FIG. 18 illustrates an example construction of a contact lens assembly having a lens formed by a concave depression in accordance with one embodiment of the present invention.

FIG. 18 illustrates an example construction of a contact lens assembly having a lens formed by a concave depression in accordance with one embodiment of the present invention. Referring now to FIG. 18, the contact lens assembly comprises a curved transparent substrate 1813 embedded within a molded contact lens material 1810. In the illustrated embodiment, the concave depression 1816 is configured such that once the contact lens material of a higher index of refraction in the concave depression 1816 is filled and cured, the cured lens material within the concave depression 1816 functions as a lenslet for close power. In various embodiments, this lenslet enables imaging of near objects, such as a display image emitted from a near-eye display panel. Additionally, in some embodiments, the concave depression 1816 may be additionally configured to be substantially wider in a horizontal direction than in vertical direction, thereby resulting in a lenslet that allows for wider viewing angles in the horizontal direction.

The invention provides several embodiments for constructing a flexible contact lens. According to one embodiment, a flexible contact lens may be fabricated by: (i) pre-forming a lenslet using a pre-polymerized liquid; and (ii) forming a contact lens using the pre-polymerized liquid such that the lenslet is at least partially encapsulated by the contact lens.

According to another embodiment, a flexible contact lens may be fabricated by: (i) fabricating at least one optical element; (ii) partially encapsulating the optical element in a first flexible material; (iii) affixing the optical element to a front mold at a central zone; (iv) attaching a back convex mold to a front concave mold; (v) filling the mold cavity with a pre-polymerized liquid; and (vi) curing the pre-polymerized liquid. Once the pre-polymerized liquid is cured, a flexible contact lens results.

Figure 19:
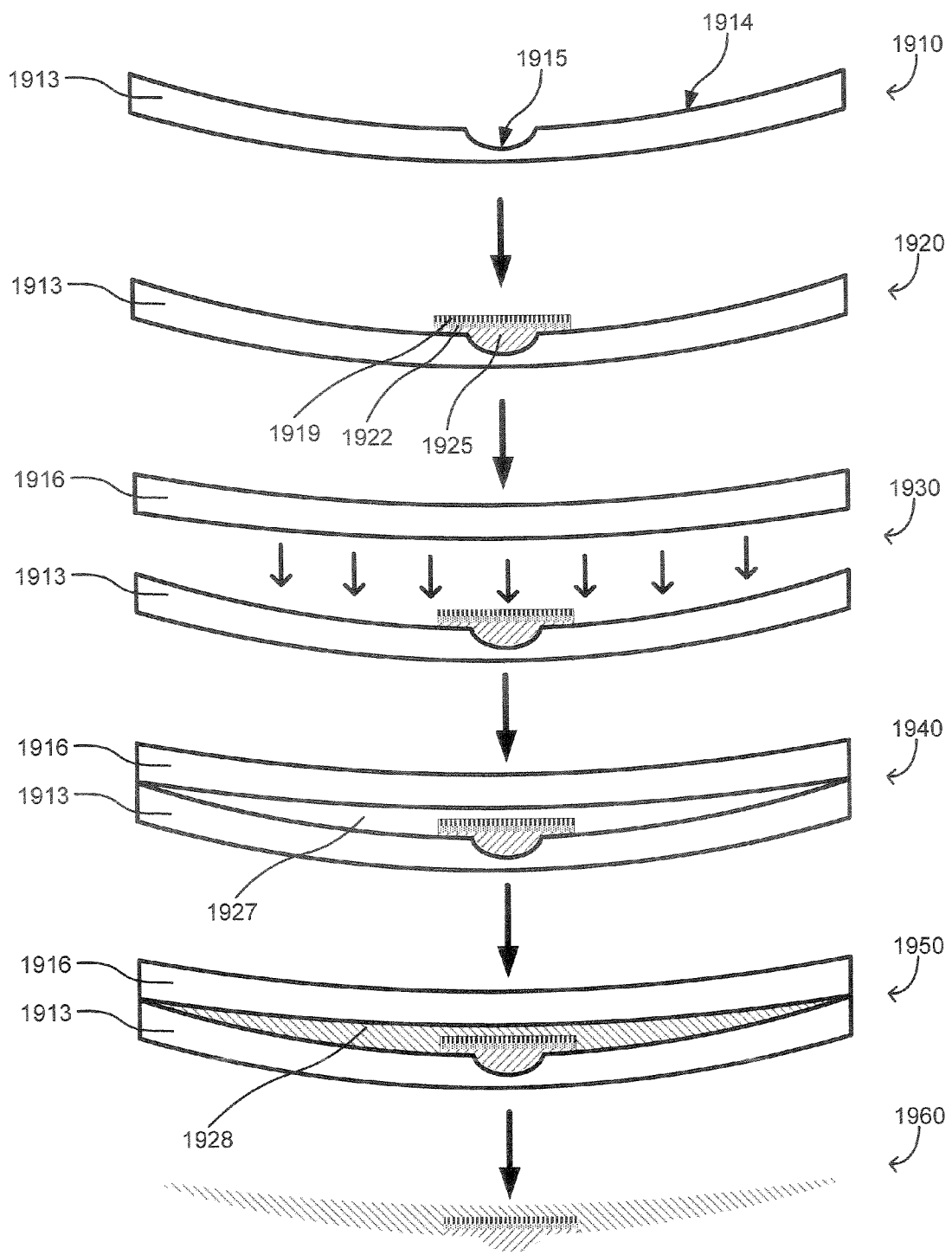
FIG. 19 is an illustration of an example process by which a contact lens assembly is constructed in accordance with one embodiment of the present invention.

FIG. 19 illustrates yet another embodiment for constructing a flexible contact lens in accordance with the present invention. Referring now to FIG. 19, a contact lens assembly is constructed using two mold halves to form a polymerized contact lens. The illustrated process begins at stage 1910 with the construction of a front mold half 1913 comprising: a first concave curve 1914 having a first radius of curvature sufficient to form a contact lens having a first optical power; and a second concave curve 1915 having a second radius of curvature sufficient to form a lenslet having a second optical power. As shown in the illustrated embodiment, the second curve 1915 is positioned on the front mold half 1913 such that the boundary of the second curve 1915 is within the boundary of the first cue 1914. In some embodiments, the lenslet formed by the second curve 1915 has a second optical power, a close power that enables imaging of near objects, such as a display image emitted from a near-eye display panel. Additionally, in some embodiments, the lenslet formed by the second curve 1915 may be substantially wider in a horizontal direction than in a vertical direction, thereby allowing for wider viewing angles in the horizontal direction.

As illustrated, the second curvature 1915 is centered with respect to the geometric center of the front mold half 1913. Alternatively, the second curve 1915 may be positioned off center from the geometric center of the front mold half 1913. In doing so, the lenslet resulting from the second curve 1915 may be properly positioned over the visual axis of an eye when it is anticipated that positioning the second curve 1915 at the geometric center of the front mold half 1913 will not result in proper positioning.

Continuing with stage 1920, the front mold half 1913 is first partially filled with pre-polymerized liquid. For example, in the illustrated embodiment, the front mold half 1913 is filled such that the second curve 1915 is completely filled and the first curve 1914 is only partially filled. Subsequently, the pre-polymerized liquid is cured, resulting in a polymerized material that forms lenslet 1925. Next, the surface of the resulting lenslet 1925 is covered with an adhesive or adhesion promoter 1922 to affix a filter assembly 1919 to the lenslet 1925. Depending on the embodiment, the filter assembly 1919 may or may not be centered over the lenslet 1925. Additionally, for some embodiments, the filter assembly 1919 may include a bandwidth filter, a polarizing filter, or some combination thereof.

In further embodiments, the adhesive or adhesion promoter 1922 may be a measured amount of the same pre-polymerized liquid used in forming the lenslet 1925. For some such embodiments, an additional curing step is employed to complete the attachment of the filter assembly 1919 to the lenslet 1925.

At stage 1930, the back mold half 1916 is attached to the front mold half 1913, thereby forming a mold cavity 1927, as illustrated at stage 1940. Thereafter, at stage 1950, the mold cavity 1927 is filled with a pre-polymerized liquid and the material is cured. The resulting polymerized material forms a contact lens 1928. Finally, at stage 1960, the mold halves (1913 and 1916) are separated, and the flexible contact lens extracted.

For further embodiments, the front and back mold halves may further incorporate means for rotational stabilization of the contact lens on the eye. These means may include, but are not limited to, prism ballast, double slab off, or variations in the thickness profile of the annulus surrounding the optic zone of the contact lens.

Figure 20:
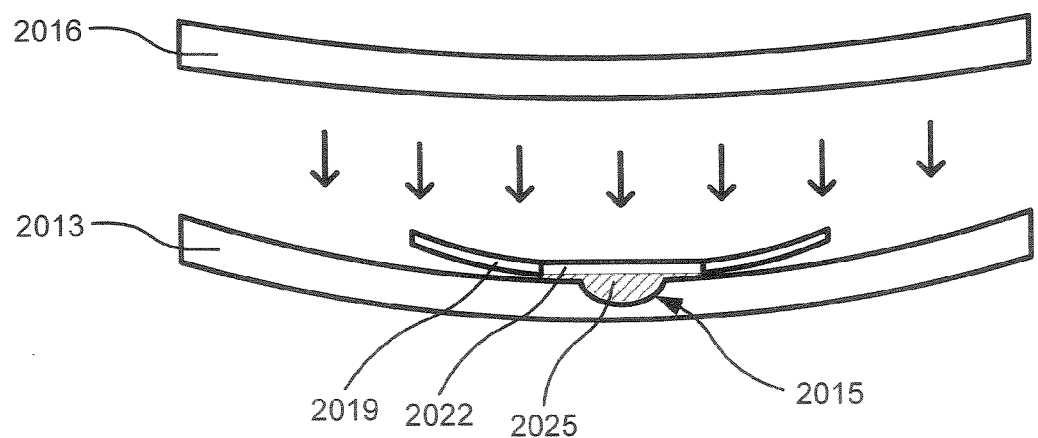
FIG. 20 is an illustration of a further example process by which a contact lens assembly is constructed in accordance with one embodiment of the present invention.

Turning now to FIG. 20, an alternative embodiment for constructing a flexible contact lens in accordance the present invention is provided. As shown, an integrated element is first created (i.e., pre-formed), comprising a pre-formed lenslet 2025, a first filter 2022, and a second filter 2019. For some embodiments, the first filter 2022 is a bandwidth filter and the second filter 2019 is a polarizing filter. A flexible contact lens is constructed according to this illustrated embodiment by: (i) affixing the integrated element to a front mold half 2013; (ii) attaching the back mold half 2016 to the front mold half 2013; (iii) filling the mold cavity created by adjoining the front and back mold halves (2013 and 2016) with a pre-polymerized liquid; and (iv) curing the pre-polymerized liquid. Thereafter, the front and back mold halves are separated, and the flexible contact lens extracted.

In further embodiments, the integrated element may be affixed to the front mold half with a water-soluble wax or other material that is not dissolved by the pre-polymerized liquid. In the illustrated embodiment, when the mold cavity is filled with the pre-polymerized liquid, the liquid covers all but the central lenslet 2025. In addition, a space remains between the outer filter (second filter 2019) and the front mold half 2013, thereby allowing the pre-polymerized liquid to fill the space while not covering the lenslet 2025 within the curve 2015. This results in the integrated element being partially encapsulated in the polymerized material that forms the flexible contact lens.

Figure 21:
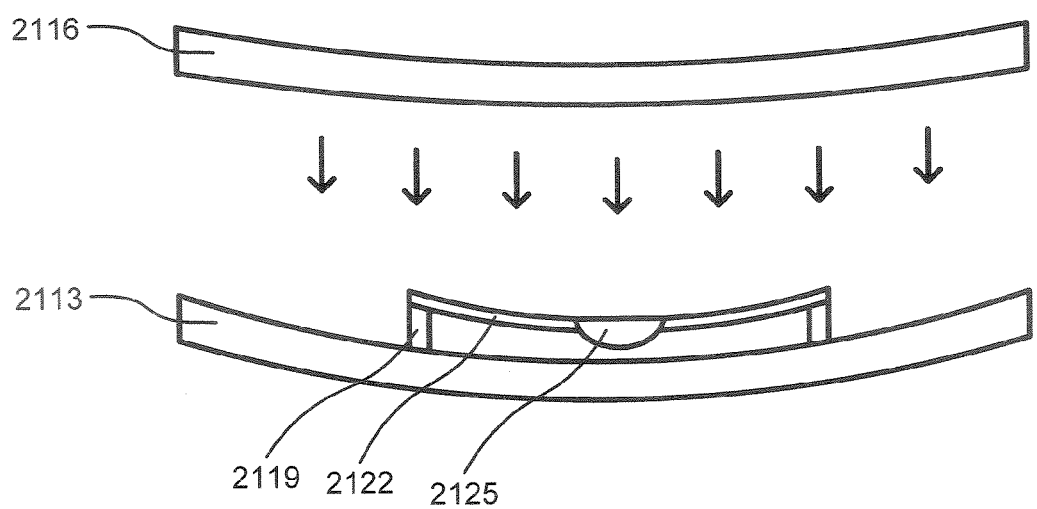
FIG. 21 is an illustration of another example process by which a contact lens assembly is constructed in accordance with one embodiment of the present invention.

Referring now to FIG. 21, a further embodiment for constructing a flexible contact lens in accordance the present invention is provided. In the illustrated embodiment, an integrated element is first created (i.e., pre-formed), comprising a pre-formed lenslet 2125, and a filter 2122. Optionally, the integrated element may further comprise a second filter (not shown) that is affixed to lenslet 2125.

Continuing with FIG. 21, a flexible contact lens is constructed in accordance with the illustrated embodiment by: (i) mounting the integrated element to either the front mold half 2113 (as illustrated) or the back mold half 2116 (not illustrated) using supports 2119; (ii) attaching the back mold half 2116 to the front mold half 2113; (iii) filling the mold cavity created by adjoining the front and back mold halves (2113 and 2116) with a pre-polymerized liquid; and (iv) curing the pre-polymerized liquid. Subsequently, the front and back mold halves are separated, and the flexible contact lens extracted. The resulting flexible contact lens contains a fully encapsulated integrated element. It should be noted that the integrated element can be mounted to either the front or back mold half such that the lenslet 2125 is centered or displaced with respect to the geometric center of the flexible contact lens.

According to some embodiments, the supports 2119 used in mounting the integrated element to either of the mold halves are configured to suspend the integrated element at a predetermined distance between the two mold halves. Additionally, once a pre-polymerized liquid is cured, the material 2119 remains permanently within the flexible contact lens. As a result, in some embodiments, the supports 2119 are placed outside the optic zone and near the periphery of the integrated element, as to avoid interference with the optical quality of the lens.

Depending on the embodiment, the material used to create supports 2119 may be selected from a number of soft or rigid polymerized lens materials well known to those skilled in the art. Additionally, the material of supports 2119 may have the same index of refraction as the polymerized material forming the body of the flexible contact lens, thereby resulting in negligible optical effect if placed in the optic zone of the lens.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for fabricating a flexible contact lens, comprising:
    fabricating at least one optical element having an extrusion;
    providing a front concave mold, wherein the front mold has an intrusion to accommodate the extrusion of the optical element;
    affixing the extrusion of the optical element to the intrusion of the front mold;
    attaching a back convex mold to the front concave mold, thereby forming a mold cavity; and
    filling the mold cavity with a pre-polymerized liquid, whereby upon polymerization, the pre-polymerized liquid forms the flexible contact lens and the optical element is partially encapsulated within the lens.

2. The method of claim 1, wherein at least one optical element is a refractive lenslet, a diffractive lenslet, a pinhole aperture, a selective chromatic filter, a circular polarizing filter, a linear polarizer filter, a gray attenuator filter, a zone plate, or a birefringent filter.

3. The method of claim 2, wherein the pinhole aperture has a diameter from about 0.5 to about 2 millimeters.

4. The method of claim 2, wherein the refractive lenslet has an optical power sufficient to provide a multifocal capability that corrects presbyopia.

5. The method of claim 2, wherein the refractive lenslet has an optical power sufficient to allow a retina to focus on an object in a spectacle plane.

6. The method of claim 2, wherein the diffractive lenslet has a focal power for distance and near viewing such that the focal power corrects presbyopia.

7. The method of claim 1, wherein the extrusion of the optical element is affixed to the intrusion of the front mold using a material that is not soluble by the pre-polymerized liquid.

8. The method of claim 1, wherein the extrusion of the optical element is affixed to the intrusion of the front mold using a material that is removable upon extracting and hydrating the polymerized lens.

9. A method for fabricating a flexible contact lens, comprising:
    fabricating at least one optical element;
    partially encapsulating the optical element in a first flexible material;
    affixing the optical element to a front mold at a central zone;
    attaching a back convex mold to the front concave mold, thereby forming a mold cavity; and
    filling the mold cavity with a pre-polymerized liquid, whereby upon polymerization the pre-polymerized liquid forms the flexible contact lens.

10. The method of claim 9, wherein the optical element is affixed to the front mold and the front mold is configured such that the optical element is located at a geometric center of the contact lens.

11. The method of claim 9, wherein the optical element is affixed to the front mold and the front mold is configured such that the optical element is displaced from a geometric center of the contact lens.

12. The method of claim 9, wherein the optical element is fabricated to be concave, convex, or non-curved on a posterior surface.

13. The method of claim 9, wherein the front concave mold and back convex mold are configured such that the flexible contact lens formed is a spherical contact lens or a toric contact lens.

* * * * *